United States Patent [19]
Warnock et al.

[11] Patent Number: 5,634,064
[45] Date of Patent: May 27, 1997

[54] METHOD AND APPARATUS FOR VIEWING ELECTRONIC DOCUMENTS

[75] Inventors: John E. Warnock, Los Altos; William H. McCoy, San Francisco; Richard J. Cohn, Palo Alto; Allan P. Padgett, Menlo Park, all of Calif.

[73] Assignee: Adobe Systems Incorporated, San Jose, Calif.

[21] Appl. No.: 693,489

[22] Filed: Aug. 2, 1996

Related U.S. Application Data

[63] Continuation of Ser. No. 304,680, Sep. 12, 1994, abandoned.

[51] Int. Cl.$^6$ ........................................ G06T 1/00
[52] U.S. Cl. .................... 395/774; 395/779; 395/788; 395/341; 395/342
[58] Field of Search ........................ 395/145–148, 395/155–161; 364/419.1, 419.17; 434/118

[56] References Cited

U.S. PATENT DOCUMENTS

| | | | |
|---|---|---|---|
| 5,001,697 | 3/1991 | Torres | 395/157 |
| 5,146,552 | 9/1992 | Cassorla et al. | 395/145 |
| 5,341,466 | 8/1994 | Perlin et al. | 395/139 |

OTHER PUBLICATIONS

*Classified Search and Image Retrieval Student Manual;* PRC; May 1991; ch 1: pp. 2–3; ch 2: pp.6, 14; ch 3: pp. 2–3; ch 4: p. 13.

"FrameMaker 4, Windows and Macintosh Version," Frame Technology International Limited, Sep. 1993, pp. 27-2-27.29.
"FrameMaker Reference," Frame Technology Corporation, May 1991, pp. 1-19-1-25.

*Primary Examiner*—Joseph H. Feild
*Attorney, Agent, or Firm*—Fish & Richardson P.C.

[57] ABSTRACT

A reader for displaying an electronic document stored in a predetermined format and allowing articles of the document to be read in the direction of their content information flow. The reader includes a selector to select an article of the document to be read. A displayer displays a first portion of the article in a manner which promotes comfortable viewing, and a navigator permits the display of the next and remaining sequential portions of the article in content flow (or reverse content flow) order. Preferably, the displayer pans and zooms, as necessary, to position the article portion in an article viewing window. A method for viewing electronic documents on a digital computer includes the steps of storing in the memory of the digital computer an electronic document, selecting an article to be displayed on an output device of the digital computer in an article view, displaying at least a portion of the article in the article viewing mode on the output device, and using an input device of the digital computer to cause a display of additional portions of the article to be displayed on the output device in the article viewing mode. These additional portions of the article are determined, at least in part, by predefined article sections and section links of the document so that the thread of the article can be followed in forward and reverse directions.

37 Claims, 18 Drawing Sheets means for..." would be interpreted more broadly than an analogous structural clause such as "a controller for...". In fact, as the law stands today, just the opposite would appear to be true.

By way of historical context, the United States patent laws provide that an invention may be claimed in terms of a means for providing a function. 35 USC §112 ¶6. If read literally, an element of a claim described as a means for performing a function would encompass any means for performing the required function. Over the years, there have been numerous court cases that suggested that means plus function language does indeed cover virtually any means for performing the function. However, most recently, the Court of Appeals for the Federal Circuit (CAFC) has emphasized that section 112, ¶6 is not intended to cover any conceivable means for performing the required function. Rather, such claims are limited by the embodiments disclosed in the specification. That is, claims written in means-plus-function format must be construed to cover the structure, material, or acts described in the specification and their structural equivalent (continued page 2)

Fig. 4d

METHOD AND APPARATUS FOR VIEWING ELECTRONIC DOCUMENTS

This is a continuation of application Ser. No. 08/304,680, filed Sep. 12, 1994, now abandoned.

BACKGROUND OF THE INVENTION

1. Field of the Invention

This invention relates generally to the creation, distribution and display of electronic documents and more particularly to the viewing of electronic documents.

2. Description of the Related Art

In this "information era", it has become increasingly common to create, transmit, and display documents in electronic form. Electronic documents have a number of advantages over paper documents including their ease of transmission, their compact storage, and their ability to be edited and/or electronically manipulated.

An electronic document typically has information content (such as text, graphics, and pictures) and formatting information which directs how the content is to be displayed. With recent advances in multimedia technology, documents can now also include sound, full motion video, and other multimedia content.

An electronic document is provided by an author, distributor or publisher (hereafter "publisher") who often desires that the document be viewed with the appearance with which it was created. This, however, creates a problem in that electronic documents are typically widely distributed and, therefore, can be viewed on a great variety of hardware and software platforms. For example, the video monitors being used to view the document can vary in size, resolution, etc. Furthermore, the various software platforms such as DOS, Microsoft Windows™, and Macintosh™ all have their own display idiosyncrasies. Also, each user or "reader" of the electronic document will have his or her own personal viewing preferences, which should be accommodated, if possible.

A solution proposed for this problem is to provide the content information of an electronic document without a predetermined final format. The content information then can be dynamically formatted (including the creation of line breaks, page breaks, etc.) as it is read by the user. Examples of this solution include the Standard Generalized Mark-Up Language (SGML) and the Office Document Architecture (ODA), both of which emerged through government/military standardization efforts.

The aforementioned proposal has never gained widespread acceptance. One reason is that formatting complex documents "on the fly" can be slow and can, in practice, produce results that may be aesthetically unpleasant. Another is that when publishers distribute documents, they intend that the documents have a particular appearance for its readers. Solutions which involve dynamic document formatting suffer from the undesired result that the publisher can't control the final appearance of the document. This may be adequate for some content information (such as technical proposals or informal memos), but for the bulk of business and artistic communication, presentation may be a critical factor.

A partial solution to this problem is to provide a document in a predetermined format where the appearance of the document as viewed by a reader is as it was intended by the publisher. One such predetermined format is the Portable Document Format™(PDF™) developed by Adobe Systems, Inc. of Mountain View, California. An example of software for creating and reading PDF documents is the Acrobat™ software, also of Adobe Systems, Inc. The Adobe Acrobat software is based on Adobe's PostScript® technology which describes formatted pages of a document in a device-independent fashion. However, PostScript technology is not well suited to the aforementioned dynamic reformatting process.

Electronic documents often include one or more articles. For example, a newsletter may include a main article and several secondary articles. Not infrequently, the articles are broken into various sections which may be scattered throughout the document. For example, a main article might start on page one of a newsletter, and conclude on pages three and four of the newsletter. It is therefore apparent that documents transmitted in a predetermined format (such as PDF) may include article sections that are physically separated within the document. This can make the reading of a particular article difficult. While prior software, such as the aforementioned Adobe Acrobat™ software, may include a rich set of pan and zoom options, it can still be difficult to read an article in content flow order to follow the "thread" of the article. Other software, including publishing software such as Personal Press™ of Adobe Systems, Inc. permits columns of an article to be "chained" together, but does not aid a reader in reading the article.

SUMMARY OF THE INVENTION

The present invention permits an article of a electronic document to be read in content flow order. A reader can therefore follow the "thread" of the article in a convenient, easily comprehended fashion. As the reader navigates through the article, the appropriate portions of the article are automatically panned and zoomed into a reading area of a display window to enhance the readability of those portions of the article.

More particularly, an electronic document viewer of the present invention includes a digital computer system and an electronic document stored in the memory of the computer system. The document includes both article section information and section link information. A computer implemented process determines a desired view mode from a group of pre-defined view modes that include a normal view and an article view. When in the normal view mode, the document viewer displays at least a portion of the document on a computer screen that has the formatting and appearance intended by the publisher of the document. When in the article view mode, at least a portion of a selected article is displayed on the computer screen in an enhanced article view which facilitates in the comfortable reading of the document. Also, when in the article view, the reader can navigate through the article in forward and reverse content flow order by using the article section information and the section link information of the electronic document.

An electronic document system of the present invention includes a document generator and a document reader. The document generator creates a document including one or more articles, each of which has one or more article sections. The document also includes information concerning section links between consecutive sections within a particular article. The document reader can preferably display the document in at least the aforementioned normal view mode and article view mode. When in the article view mode, the document reader makes use of article section information and link information to display portions of the article in an article reading area or window in such a manner that the entire article can be read regardless of the physical arrangement of any article section within the document.

A method for displaying an article of a document on a screen of a computer system in accordance with the present invention includes the steps of: (a) selecting an article for display from within a document stored in the memory of a computer system; (b) determining an initial view pointer which points to an initial portion of the article to be viewed; (c) displaying, as indicated by the view pointer, at least the portion of the article within an article view area of the screen, in a manner to enhance its readability; (d) changing the view pointer; and (e) repeating steps c and d to view other portions of the article. The article can be selected by a variety of modes including selecting an article from a list of articles displayed on the screen, or selecting a visible portion of an article from a document being displayed in the normal view. Preferably, the displaying step causes the selected portion of the article to be automatically sized within the article view area to enhance its readability. This is often referred to as a "zoom." Also, the selected portion is preferably automatically fitted to the window in an operation known as a "pan."

An advantage of the present invention is that an electronic document can be viewed with the appearance of the originally created document. Specific articles within the document can be viewed in an article viewing mode in forward or reverse content flow order. Furthermore, selected portions of the article are automatically panned and zoomed to fit a viewing area or window to enhance the readability of the article.

These and other advantages of the present invention will become apparent to those skilled in the art upon a reading of the following descriptions of the invention and a study of the several figures of the drawing.

BRIEF DESCRIPTION OF THE DRAWINGS

FIGS. 3a–3f are illustrations used to illustrate, by way of example, the process of FIG. 3;

FIGS. 4a–4e are illustrations used to illustrate, by way of example, the process of FIG. 4;

DETAILED DESCRIPTION OF THE PREFERRED EMBODIMENTS

Figure 1:
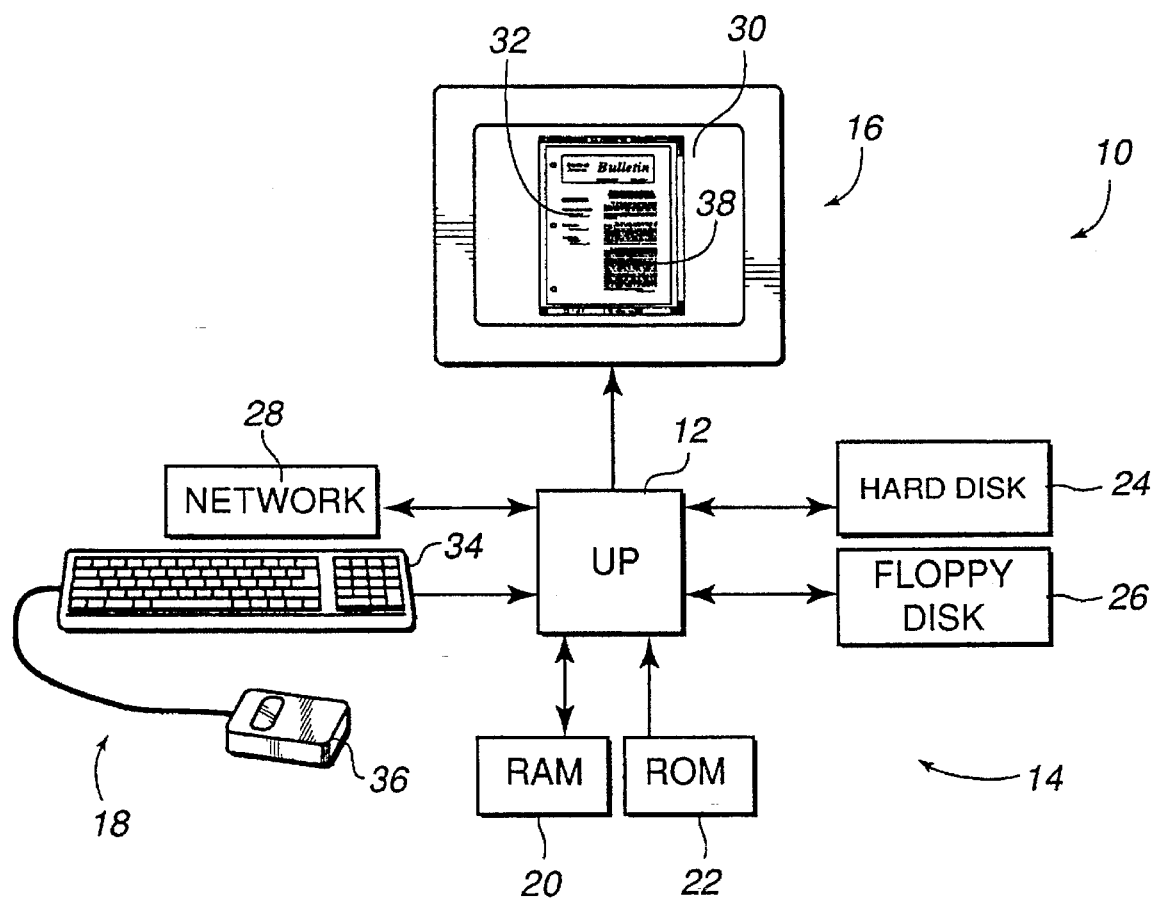
FIG. 1 is a block diagram of an electronic document viewer in accordance with the present invention.

An electronic document viewer 10 in accordance with the present invention includes a digital processor 12, memory 14, a visual output device such as computer monitor 16, and an input device 18. Certain memory devices 14, computer monitor 16, and input devices 18 are referred to as "peripherals" because they perform peripheral functions for the digital processor 12. Typically, these peripherals are coupled to the microprocessor 12 by electronic interfaces including input/output I/O ports, direct memory access (DMA) circuitry, registers, etc. which have not been included in the block diagram of FIG. 1 because such interfaces are well known to those skilled in the art.

The digital processor 12 is preferably a single chip microprocessor or central processing unit (CPU), such as an 80486™ or Pentium™ processor available from Intel Corporation of Santa Clara, Calif., a 68040 or PowerPC™ microprocessor available from Motorola, a SPARC microprocessor available from Sun Microsystems of Mountain View, Calif., etc. The purpose of the microprocessor 12 is to provide the core digital processing for the electronic document viewer 10 of the present invention, and includes various arithmetic, logic, and control functions well known to those skilled in the art.

Memory 14 of the digital computer system 10 includes number of types of memory storage devices which can provide memory storage locations accessible by the digital processor. Therefore, as used herein, "memory" includes RAM memory 20, ROM memory 22, hard disk memory 24, floppy disk memory 26, and any other memory storage location accessible by the digital processor 12 either directly, through an intermediary, or by a peripheral. For example, additional memory may be provided in memory registers, flip-flops, latches, in VRAM associated with the monitor 16, memory locations on a network 28, cache memory, etc. The purposes of memory 14 include providing temporary or "scratch pad" memory, (e.g. RAM 20), semi-permanently stored memory (e.g. hard disk 24 and floppy disk 26), and permanently stored memory (such as ROM 22).

The monitor 16 is coupled to the microprocessor and includes a screen 30 upon which an image 32 can be displayed. Typically, the monitor 16 is a raster-type device (such as a video monitor or a liquid-crystal display panel) having a matrix of picture elements or "pixels" which can be selectably activated to create the image 32. The monitor 16 is a primary method for displaying a document (such as portrayed by the image 32) of the present invention, although other output devices such as printers can also be used.

Input device 18 in the present embodiment includes a keyboard 34 and an electro-mechanical or optical mouse 36. The input device 18 can be used to input information which is acted upon by the digital processor 12 to control a cursor 38 or other pointer on the screen 30 of monitor 16. Other pointer mechanisms such as trackballs, electronic pens, input tablets, etc. are considered to be equivalents of the mouse 36. The interaction of the input device 18 with a document displayed on the monitor 16 will be discussed in greater detail subsequently.

Figure 2:
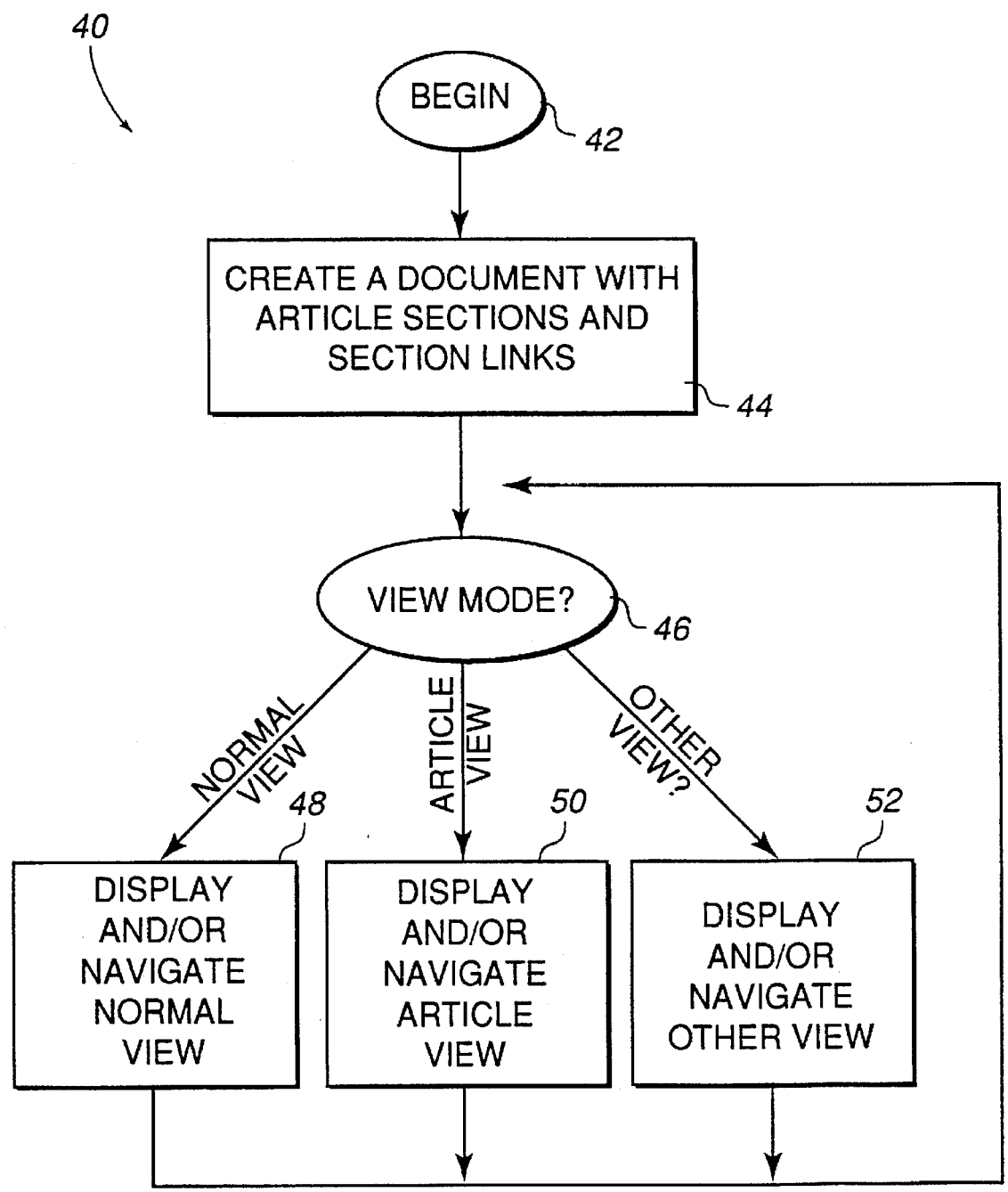
FIG. 2 is a flow diagram illustrating a process for creating and viewing a document in accordance with the present invention.

In FIG. 2, a process 40 for creating and viewing documents begins at 42 and continues in a step 44 with the creation of a document including article sections and section links. Next, in a decision step 46, it is determined in which view the document is to be opened. This can be determined by a default (e.g. always open in "normal view"), by opening the document with the same view in which it was closed, by asking the reader, or by determining a proper opening view determined by the publisher of the document. If the view mode is determined to be a normal view, a step 48 is used to display and/or navigate in the normal view, after which process control is returned to step 46. If the view mode is determine to be an article view, a step 50 displays and/or navigates the article in article view. Again, process control is return to step 46 after the completion of step 50. Finally, if other views are desired, those views are displayed and/or navigated in this "other" view in a step 52, after which process control is again returned to decision step 46 to allow the user to view the document in a different view mode. The process 40 is terminated by an appropriate exit command in response to a user input or, optionally, under automated control of the method 40.

Figure 3:
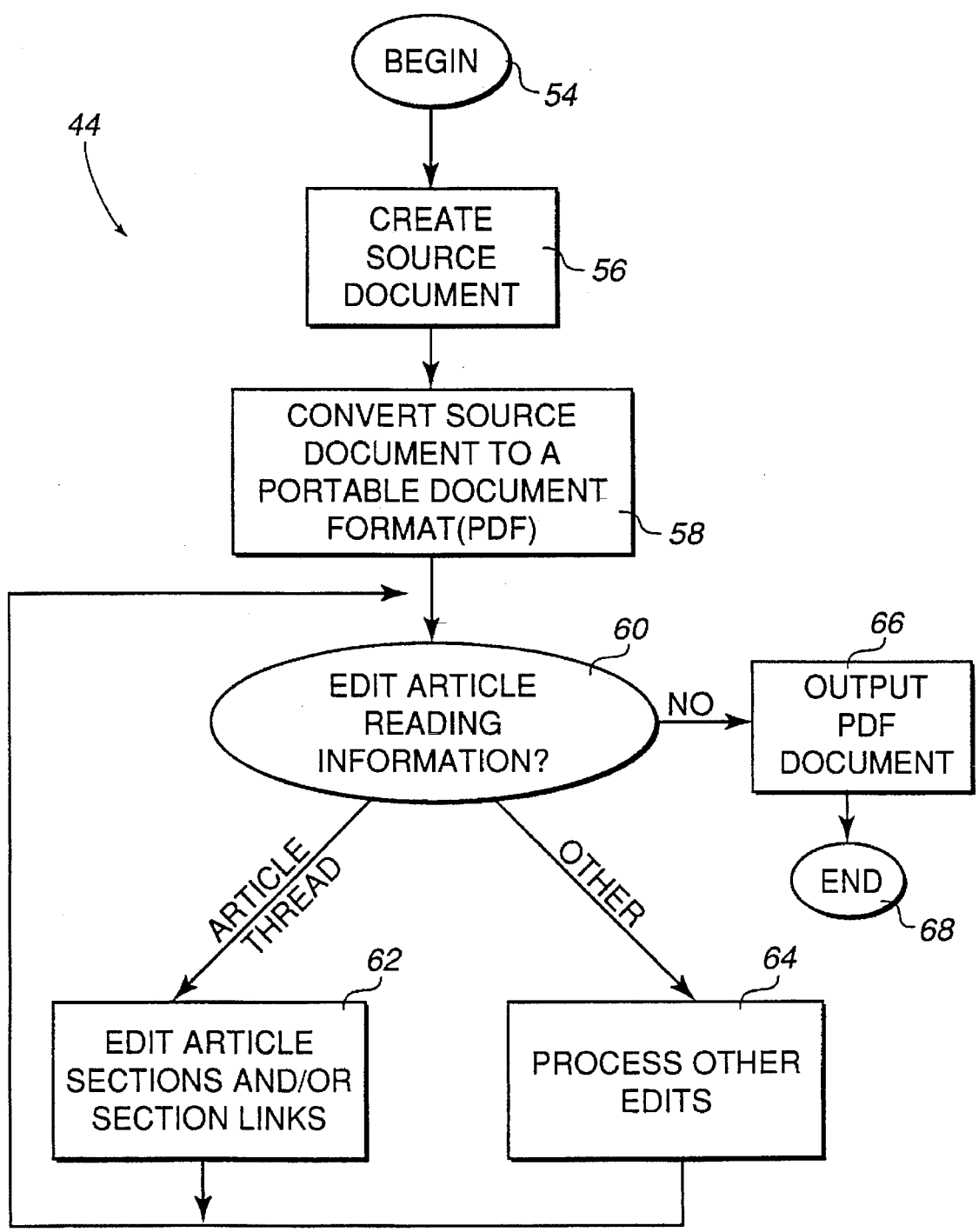
FIG. 3 is a flow diagram illustrating the "Create a Document" step 44 of FIG. 2.

In FIG. 3, the step 44 of FIG. 2 "Create a Document" is described in greater detail. The process of step 44 begins at 54 and, in a step 56, a source document is created. Next, in a step 58, the source document is preferably converted into a Portable Document Format (PDF) document. A decision step 60 then permits a user to edit the document reading information. If the author or publisher wishes to edit the article thread, a step 62 is performed to edit the article sections and/or the section links. Process control is then returned to step 60. Alternatively, other edits not germane to the discussion of the present invention are also possible, which can be processed in a step 64, after which process control is once again returned to decision step 60. If the publisher has completed the editing process, the PDF document is then output in a step 66, and the process of step 44 concludes at 68. The PDF document output by step 66 can be stored, transmitted, or otherwise distributed in a number of fashions well known to those skilled in the art. For example, the PDF document can be stored in the RAM memory of a computer, on a computer hard disk, on a floppy disk, on a CD-ROM, can be transmitted over a network or via modem, etc.

Figure 3A:
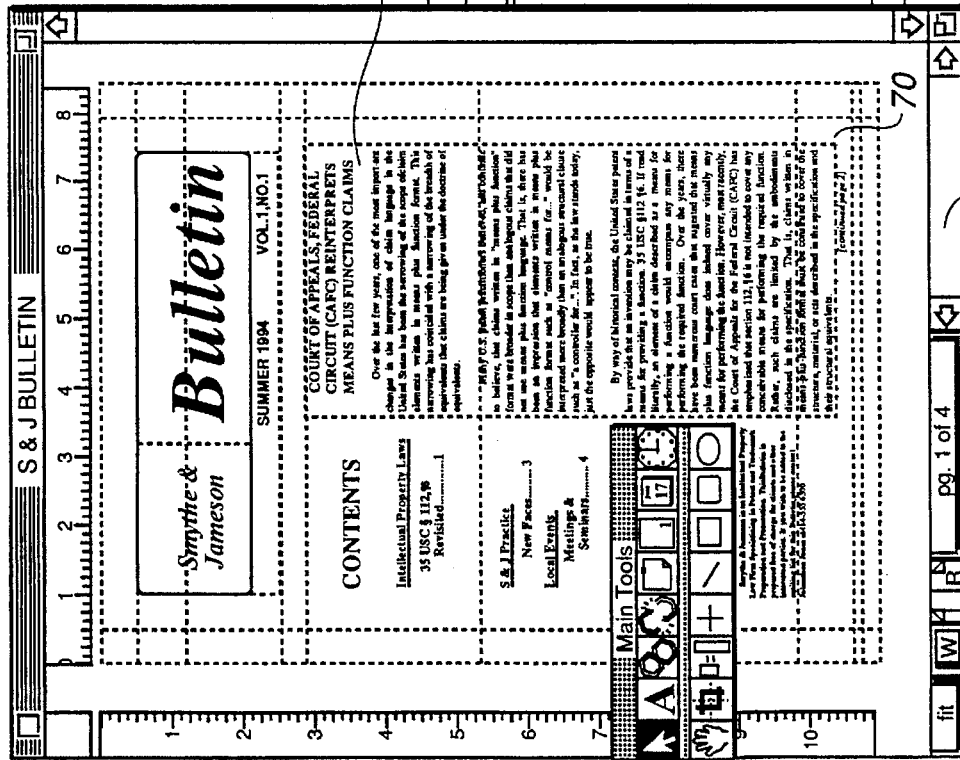
Figure 36:
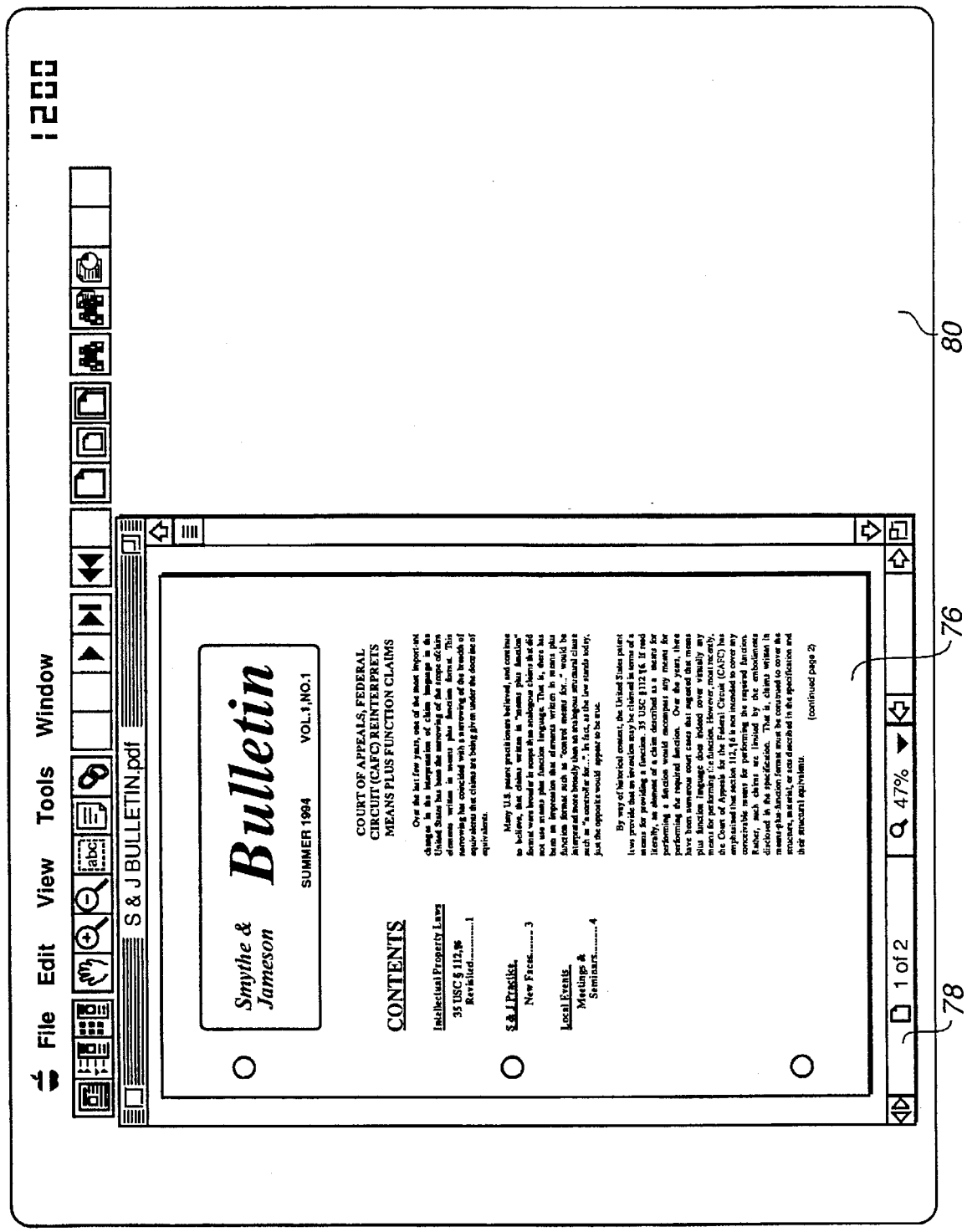

The process of step 44 will be discussed by way of example with reference to the illustrations of FIGS. 3a–3f. In FIG. 3a, a document 70 is displayed within a window 72 on a computer screen 74 of a computer monitor. In this instance, the document 70 is the first page of a newsletter which has been created using Aldus Personal Press 2.0 from Adobe Systems, Inc. The Aldus Personal Press 2.0 software which created the document 70 is but one example a type of software which can create a document including articles, such as an article 75. Other software packages include word processors (such as Microsoft Word™ of Microsoft Corporation of Redmond, Washington, WordPerfect™ of Word Perfect Corporation of Orem, Utah, etc.), page layout programs (such as PageMaker™ of Adobe Systems, Inc.), desk top publishing programs, etc.

Once a source document has been created by step 56, it is converted into a Portable Document Format (PDF) document by step 58. Such a PDF document is shown in FIG. 3b. More particularly, a PDF document 76 is shown within a window 78 on a computer screen 80. It should be noted that the PDF document 76 has the formatting and appearance of the originally created document 74 of FIG. 3a after the document 74 has been printed. In fact, in the present invention, the PDF article 76 is created by a printer driver accessed by the software which created the original document 70. In other words, the Aldus Personal Press 2.0 software utilizes a PDF printer driver to "print" to disk the PDF document 76. This process of creating a PDF document 76 from an original document 70 is known, and is practiced by the aforementioned Adobe Acrobat™ software program, among others.

The process of step 62 "Edit Article Sections And/Or Section Links" will be discussed with reference to FIGS. 3c–3f. As noted in FIG. 3c, the document 76 in window 78 includes a number of items including a masthead 82, a contents section 84, and a portion of an article 86. These "items" or "objects" are viewed as the publisher intended to, i.e. the content, arrangement, format, and appearance of the document 76 reflects the desired presentation by publisher.

Assume that the document 76 includes two pages, and that the article 86 is provided in three columns on those two pages. The present invention allows the article 86 to be read in forward or reverse content flow directions to facilitate in the efficient and comfortable reading of the article.

At this point it would be useful to define some of the terms being used in the specifications. Throughout the specification, the expression "document," "electronic document," "document content information," and the like are used somewhat interchangeably to denote a collection of information (such as text and graphical elements) and potentially including multimedia content (such as sound or video) as well as control elements such as hyperlinks or stored control programs or scripts. The term "article" is used to denote a logically related and ordered portion of the information in the document. When referring to "content flow," it is meant herein the logical ordering of information within an article irrespective with the physical ordering of information in a particular layout of the document and irrespective of the physical ordering of information in any digital representation of the document. Throughout the specification the expression "layout" and "format" are used somewhat interchangeably to denote the process of determining a particular physical relationship and appearance for document content information. For example, layout and format information determine line breaks, hyphenation, and justification for text, and determine size and relative positioning of graphical elements. The process of "laying-out" or "formatting" generally includes dividing some or all of the document information into sets of pages of a particular size. When used as nouns, "layout" and "format" denote an output of the layout and format processes, e.g. for some document a particular physical arrangement of some or all of its constituent information. As used herein, "column" is used to denote a portion of a page containing part or all of the information in an article within a particular layout of a document. A column is frequently, but not necessarily rectangular and, therefore, can be said to be bounded by a rectangle or "bounding box." When referring to a column, the term "origin" is used to denote the initial part of information within a column, and the term "width" is used to denote the physical width of a column, in reading order. The specific geometric interpretation of these terms may be system, article content, layout dependent, and written language dependent. For example, some certain languages are read from right to left or bottom to top. However, as discussed herein, the present invention is preferably used in conjunction with Roman alphabetic text where the reading order is left to right and top to bottom. In this context, the origin of a column is therefore the geometric top left of its rectangle and the width of a column is the left-to-right width of its rectangle. An "article section" is a part of an article that is coupled to another article section by an "article thread", which is an imaginary thread or line along the content flow of an article. An article section can be either shorter, longer, or the same height as a window in which it is displayed. An "article portion" is a part of an article that is displayed within a window. Therefore, an "article portion" can be either shorter, longer, or the same length as an article section. Typically, however, article sections are longer than the window in which they are displayed and, therefore, longer than the article portions.

Figure 3C:
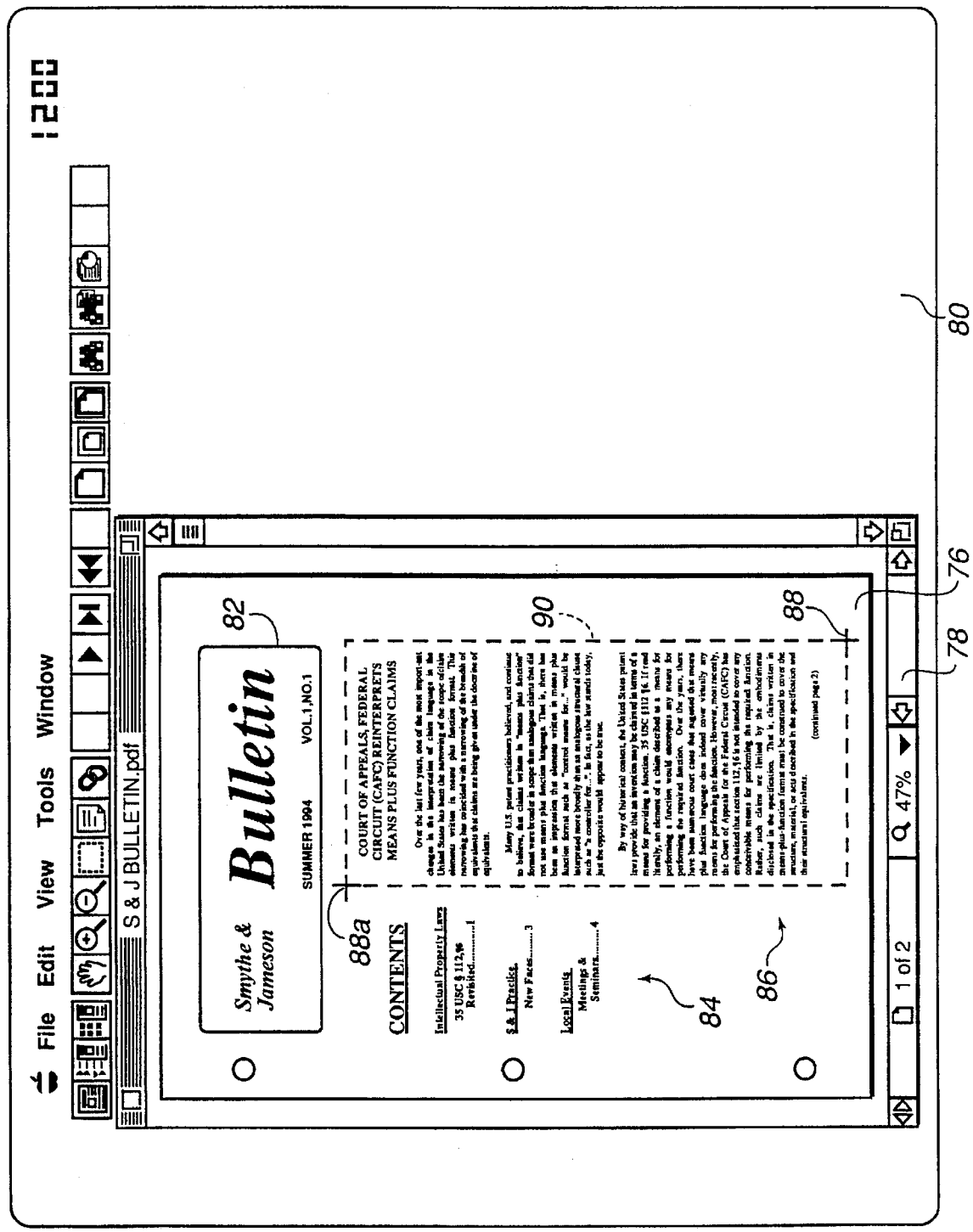
Figure 3D:
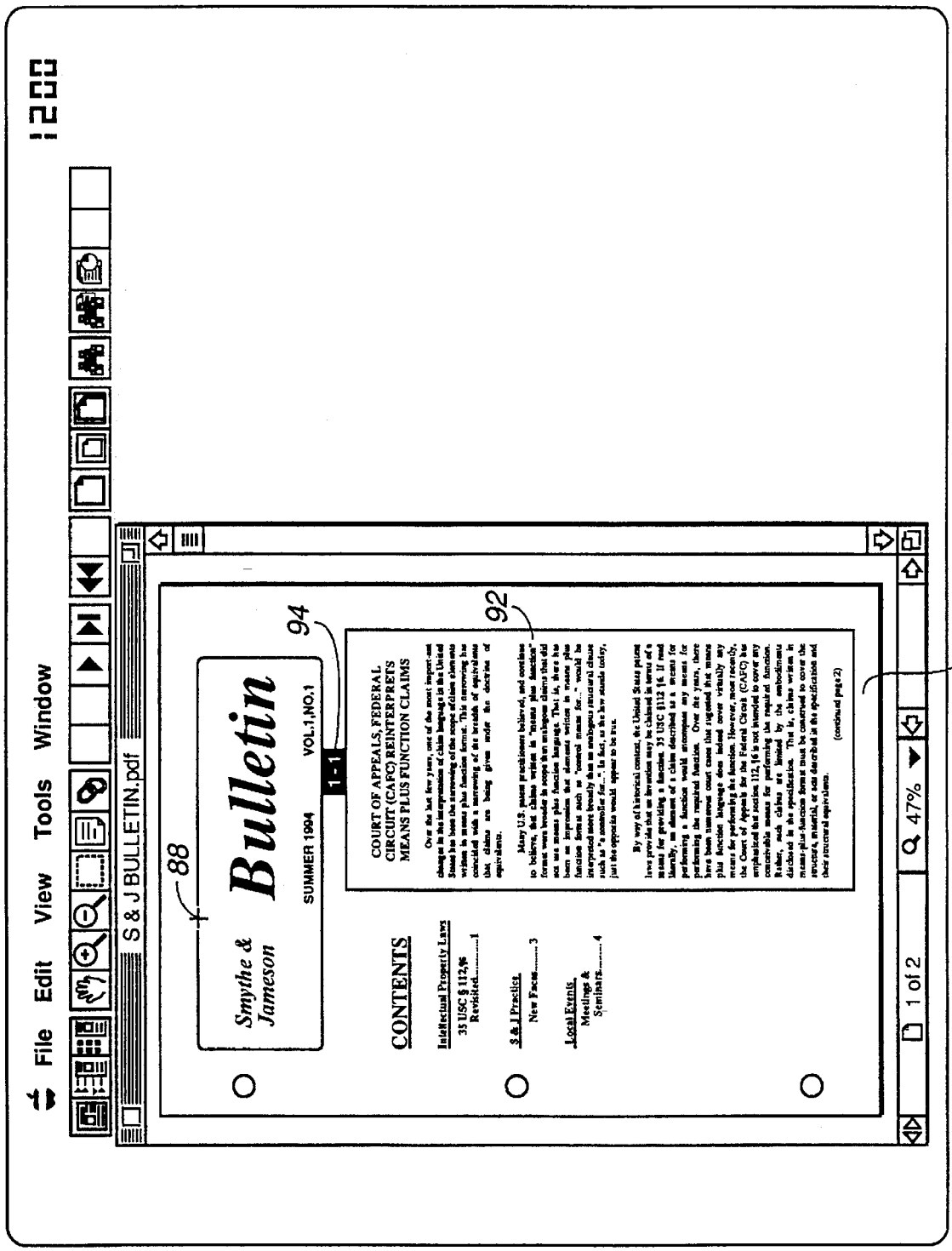
Figure 3E:
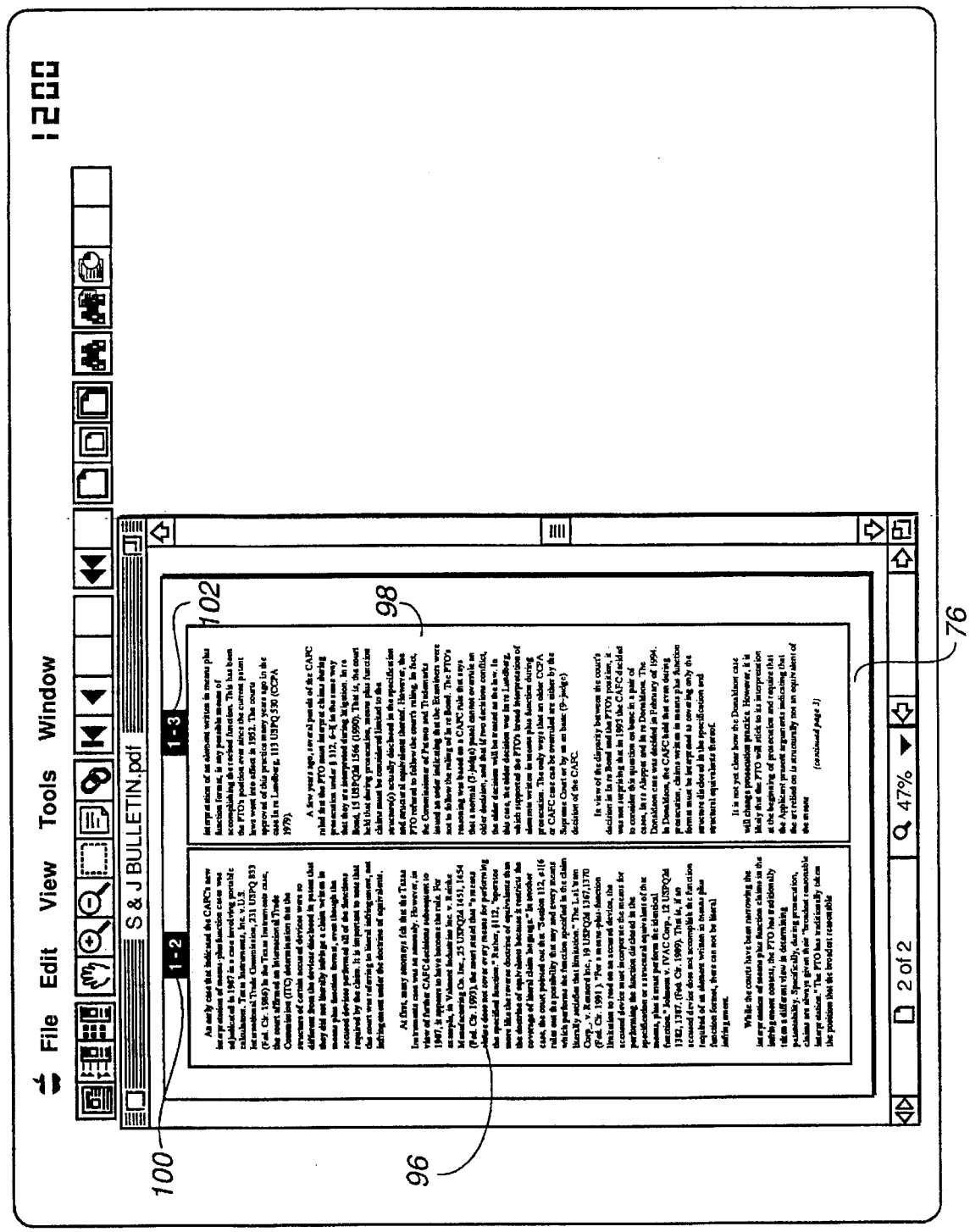

With continuing reference to FIG. 3c, an article thread is developed with an appropriate tool. In this instance, the tool is accessed from a pull-down menu (not shown) under the label "Tools" which has an article tool selection for creating article sections and links. The selection of the article tool of the pull-down menu creates an cursor 88 on the screen 80 which can be used to create a bounding box 90. More particularly, a pointing mechanism (such as mouse 36) can be used to initially position the cursor 88 at a position 88*a* and to then "drag" the cursor to its final position at 88 to create the bounding box 90 shown in broken lines. This action allows a user to manually create a first article section 92 as shown in FIG. 3*d*. In the present invention, the article section 92 created by the aforementioned process includes a header 94 including information about the article and article section. In this instance, the article 94 indicates "1—1" which indicates that this is article number one, and section number one. The cursor 88 is then used to create additional article sections 96 and 98 having headers 100 and 102, respectively (see FIG. 3*e*). The header 100 indicates that article section 96 is the second article section of article number one, and article header 102 indicates that article section 98 is the third article section of article number one.

If the document 76 includes more than one article, the article tools from the tools pull-down menu (not shown) can be accessed again to turn off the article section selection mode and then it can be thereafter selected again to repeat the article selection process for additional articles. In fact, within practical limits, any number of articles can be provided with any number of article sections. It should also be noted that the article sections do not need to be full columns but, rather can be portions of the column, for example, each paragraph of a column can be a section.

In the present invention, as the article sections are sequentially selected, an article "link" is created within the document 76 to link the sequence article sections together. Therefore, in the present invention, it is important for the creator of the document to select the article sections in content flow order. For example, if article section 98 were to be selected before article section 96, the content flow order would proceed from article section 92 to article section 98 and then article section 96. Appropriate editors can be provided to edit the links to thereby modify the article flow.

In should also be noted that, in this preferred embodiment, the linkages between the article sections are preferably circular. That is, the first article section is preferably linked to the last article section such that forward scrolling from the last article section will access the first article section, and such that a rearward scrolling from the first article section will access the last article section. Alternatively, the links can be open-ended or non-circular such that the first article section is not directly linked to the last article section.

In the described embodiment, the article sections are manually selected and the sections links are automatically provided. Alternatively, the article sections can be selected automatically and the linkages can be made manually. For example, the process of the present invention can recognize columns of text as articles and automatically provide a bounding box for all recognized article sections. A publisher can then use an input device to select which of the article sections should be linked and in which order. In yet another embodiment of the present invention, the article sections and the article links can be designated manually, and in a fully automated embodiment of the present invention, the article sections and links can be provided automatically based upon recognition technology and heuristics provided by the process. However, this fully automated embodiment will likely require a fair amount of editing to correct errors made by erroneous assumptions by the process.

While the prior art does disclose tools for manually selecting columns and manually "chaining" columns together (e.g. for newsletter publishing programs), it does not disclose the automatic creation and/or linking of article sections, nor does it disclose a circular linking process wherein a first and a last article section of an article are linked together.

Figure 3F:
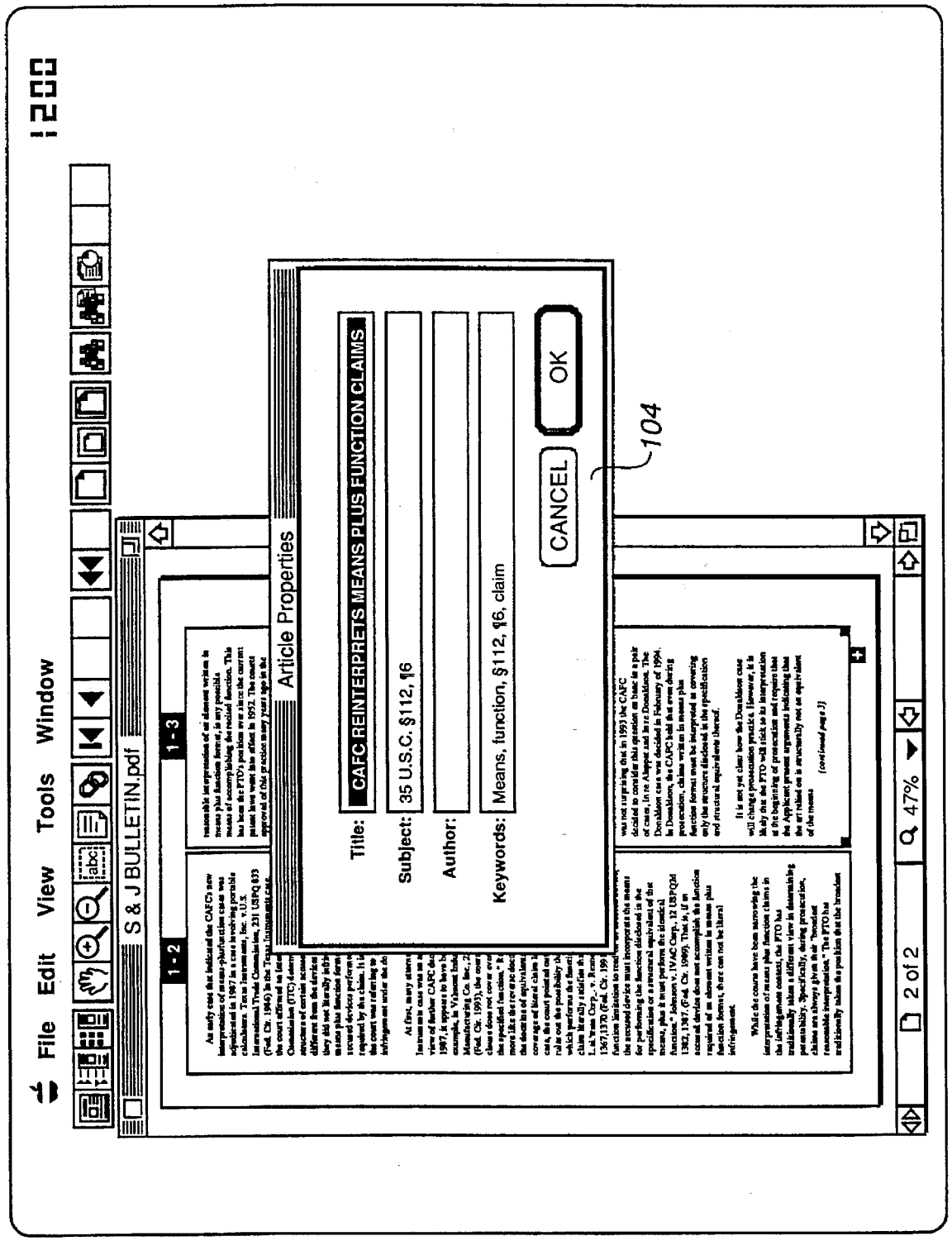

After the article sections have been selected and linked, a window 104 as illustrated in FIG. 3*f* is provided for the entry of article properties. More specifically, window 104 allows the title, subject, author, and key words pertaining to the article to be entered into the viewing system. The entries into the window 104 may be automatic or manual. For example, the title could be automatically provided by inserting the first paragraph (i.e. the title) of the article. However, it is more likely that the title, subject, author, and key words are manually entered such as through keyboard 34. As will be discussed in more detail subsequently, the article properties can be used to help find and select a desired article for viewing.

Figure 4:
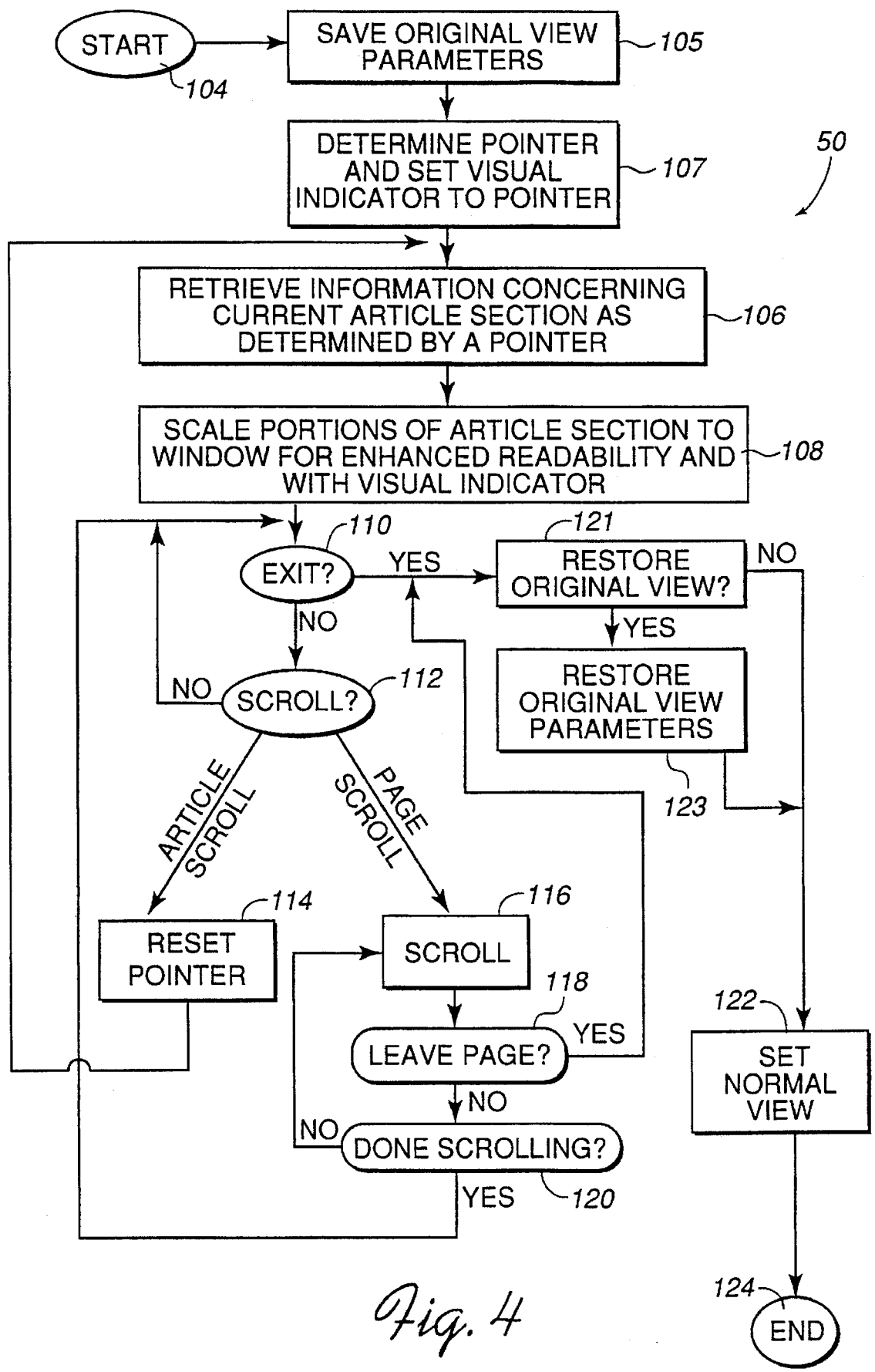
FIG. 4 is a flow diagram of the "Display And/Or Navigate Article View" step 50 of FIG. 2.

In FIG. 4, the process of step 50 of FIG. 2 "Display And/Or Navigate Article View" is shown in greater detail. The process of step 50 begins at 104 and, in a step 105, the "original" view parameters are saved to permit the optional return to the same view that the user just exited. For example, users that were in a normal view prior to entering the article view, may wish to return to the same point in the normal view after completing their reading in the article view. It is for this purpose that the original view parameters are saved in step 105.

Next, in a step 107, a pointer position is determined and a visual indicator is set to the pointer position. In the present invention, the pointer is used to point to the beginning of an article portion that is displayed within a window. With typical text which is read left-to-right, top-to-bottom, this means that the pointer is pointing to the line of an article portion which will be displayed at the top of the window. The visual indicator, in contrast, points to the location in the article portion displayed in the window that the reader is most likely going to read next. The visual indicator is provided so that readers do not lose their place when a new article portion is displayed in the window. Therefore, the visual indicator minimizes the problem of having readers searching for the next line of text to read in an article after a new article portion is displayed in the window.

The initial pointer position can be determined by a number of methods. For example, the initial pointer position can be set to the top of the article section that was selected by a cursor at the time that a mouse button was clicked. Alternatively, an option-click can set the initial pointer to the top of the article, or the pointer could always be set to the top of an article by default.

Next, in a step 106, information is retrieved concerning the current article section as determined by the pointer into the article. As mentioned above and as will be discussed in greater detail subsequently, the pointer is used to point to the top of the article portion be viewed during the article view mode. Next, in a step 108, a portion of the article section is sized to the window to enhance readability up to a maximum zoom amount. This step 108 therefore performs both a "pan" and "zoom" function by moving the desired the portion of the article into an article viewing area of a window and then increasing the size of the portion of the article to make it more readable.

Figure 4A:
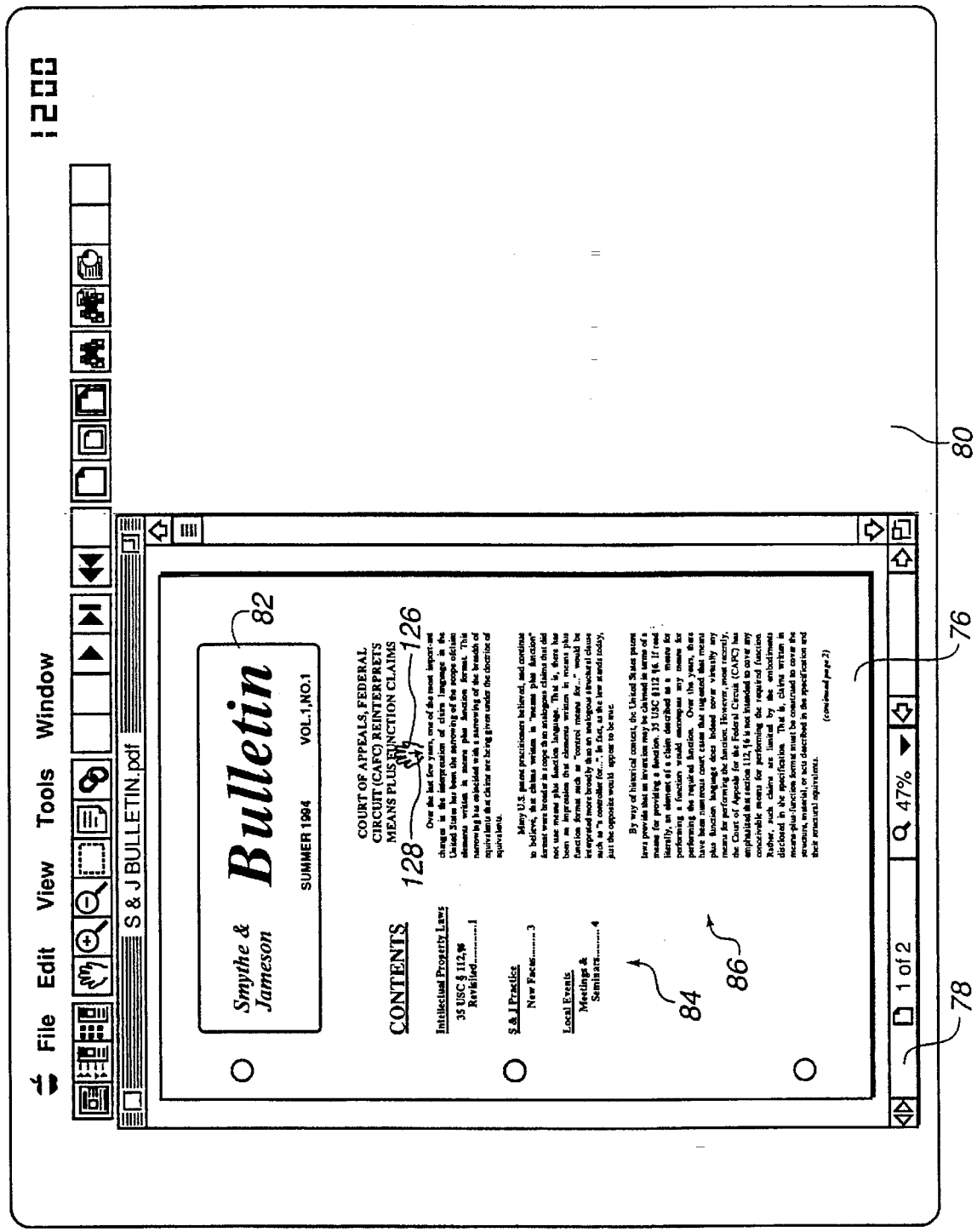

In addition, step 108 provides the visual indicator. As mentioned previously, the visual indicator indicates the position or close to the position of the next line to be read by the user. An example of a visual indicator is found in FIGS. 4c–4e. In this instance, the visual indicator is a small triangle or arrowhead which is positioned just outside the window 78 and points to the next line to be read. In FIG. 4c, the top of the article is displayed and, therefore, the visual indicator is pointing to the first line within the window 78. Note, however, in FIG. 4d that the visual indicator 13 1 is pointing to a point within the article portion rather than to the top of the article portion. This is because the next line to be read within the article portion displayed in FIG. 4d begins with the words "terms of a means ...", which follow the last sentence of the article portion displayed in FIG. 4a which ends with the words ... an invention may be claimed in ... . The visual indicator may be removed after a short period of time (e.g. about a second), as the user continues to read. Alternatively, the visual indicator may be left in place until a new article portion is displayed within the window.

It should be noted that there are a variety of ways of providing a "visual indicator." For example, the next line to be read could be momentarily highlighted in reverse video. Alternatively, the next line to be read could be displayed normally, and the remainder of the article portion could be shown in half-tone for a short period of time. It should also be noted that the visual indicator may not exactly point to the next line of text to be read. This is because the article is stored in a graphic-oriented (not line oriented) format. There may, therefore, be a graphic at the next "reading" position. Alternatively, the font size may be smaller or larger than average, changing the line spacing. The "next line" is therefore an approximation which is preferably calculated using an "average" line height, such as sixteen pixels. In consequence, the visual indicator may point slightly above or slightly below the actual line to be read.

With continuing reference to FIG. 4, a decision step 110 determines whether the user wishes to exit from the article viewing mode. If not, the process of step 50 looks for some type of scroll command in a decision step 112. If there is no scroll command, the process of step 50 enters a loop waiting for an exit, scroll, or some other type of command (not shown).

In the present embodiment, two types of scrolls are supported. One type of scroll is the normal page scroll which allows a reader to scroll around in the current page. This is typically controlled by the computer's operating system or presentation manager. The other type of scroll is an article scroll which causes a forward or reverse, quantized scrolling of a portion of an article along an article thread defined by a content flow of the article. If the scroll detected at step 112 is an article scroll, a step 114 is used to reset the pointer and process control is returned to step 106 to display a new portion of the article. It should be noted that this new portion of the article is automatically panned and zoomed to fit within the article view area of the window, as with the previous article section, to enhance readability.

If the step 112 detects a page scroll, a scroll command is generated and the user is allowed to scroll within the page. This page scroll is typically accomplished by the use of the standard horizontal and vertical scroll bars provided in Macintosh Windows, Microsoft Windows, etc. Next, a step 118 determines whether the act of scrolling has caused the user to leave the current page. If not, a step 120 determines whether scrolling is completed. The scrolling is not completed, steps 116 and 118 are repeated until scrolling is completed, at which time process control returns to step 110.

There are several ways for exiting the article view mode in accordance with the present invention. One is an explicit command to exit as detected by decision step 110. The other is the act of leaving the page during a page scroll as detected by step 118. There are, of course, other ways to exit, such as a use of a hot key, etc. In any event, when it is desired by the user to leave the article view mode, process control is turned over to decision step 121 which determines whether the original view should be restored. As explained previously with reference to step 105, the original view parameters are stored so that users may optionally return to the same view that they had previously exited. Step 121 can determine whether to restore the original view by default, or based upon certain heuristics, or by asking the user, or by looking for a command sequence from the user (e.g. pressing a certain function key or command sequence on the keyboard). If the original view is to be restored, the original view parameters are restored in step 123. In either event (i.e. whether or not the original view is to be restored) the view mode is then set to a normal view in a step 122. The process of step 50 is then completed at 124.

The process of step 50 of FIG. 4 will be described by way of an example with reference to FIGS. 4a–4e. In FIG. 4a, the document 76 is displayed within window 78 on computer screen 80 in a "normal view" including a number of article and non-article items such as masthead 82, content list 84, and article 86. A first method of the present invention for leaving a normal view mode and entering an article view mode as detected by decision step 46 of FIG. 2 is to select a "hand" icon from the horizontal tool bar at the top of screen 80 to create a hand cursor 126 on the document 76. The hand cursor 126 includes an arrow 128 which indicates direction for article scrolling, i.e. either forward (in the direction of content flow) or reverse (in the reverse direction of content flow). By "clicking" a button on mouse 36, the hand cursor 126 will select the article 86 for the entry into the article view mode.

Figure 4B:
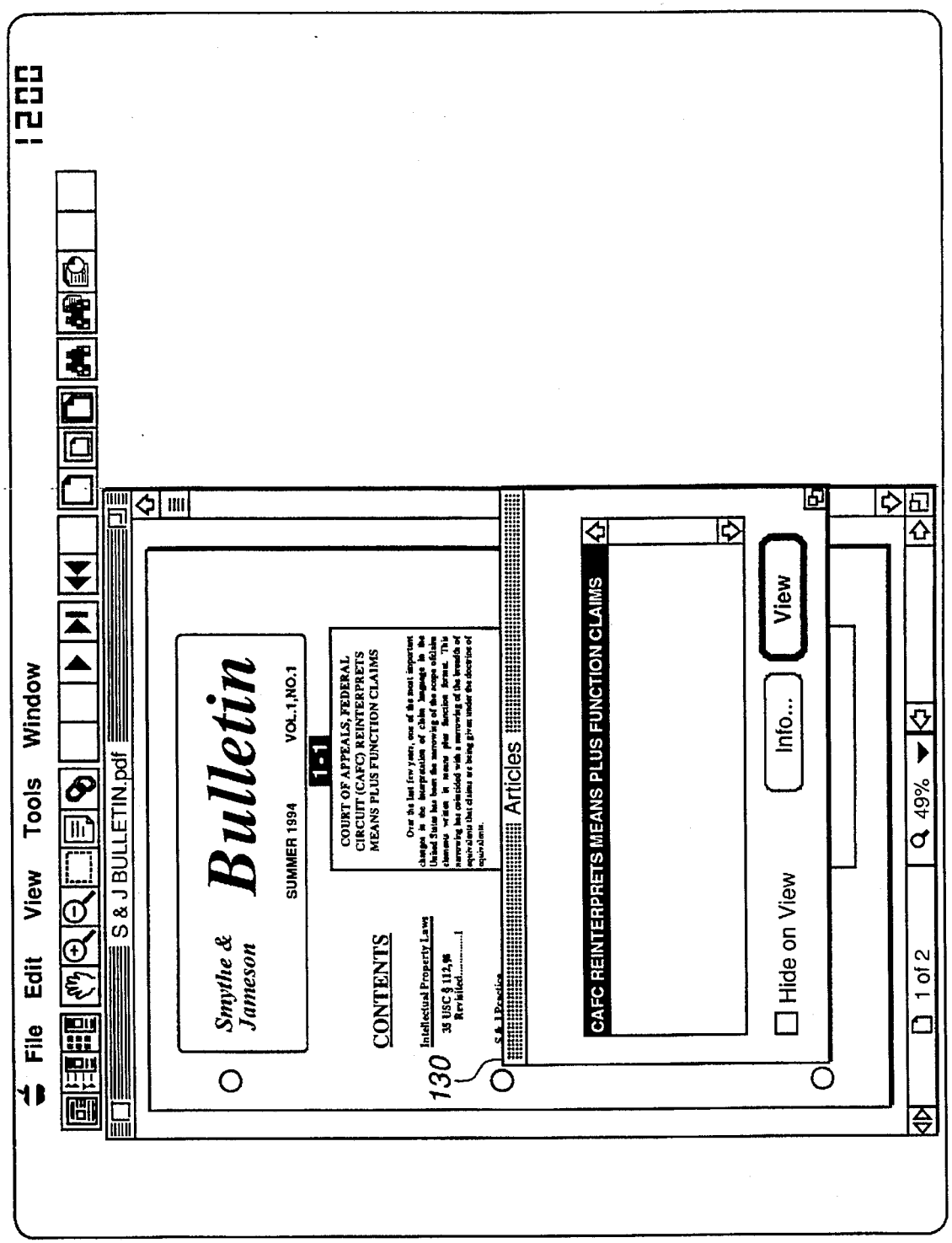
Figure 4C:
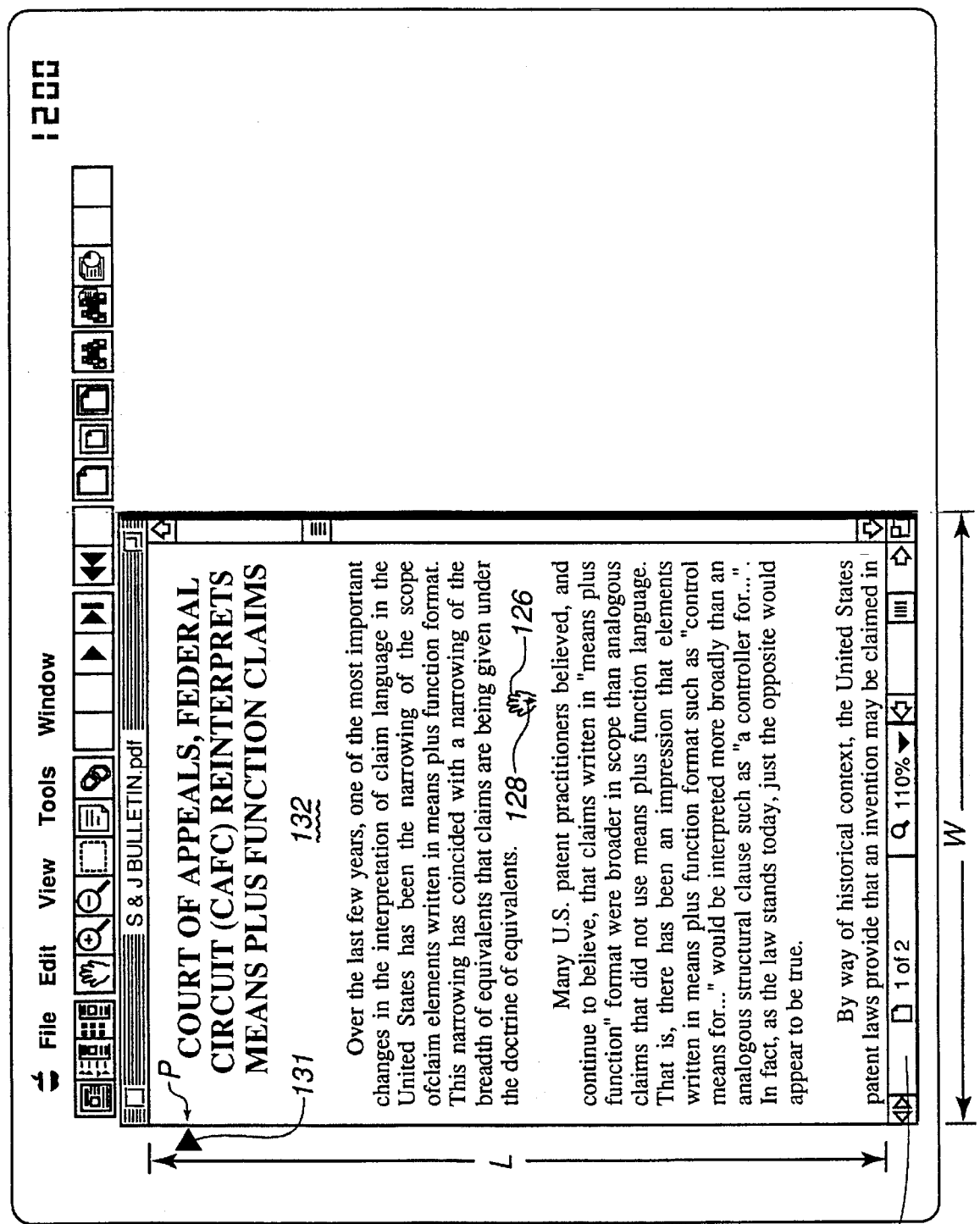

An alternative method for entering the article view mode is illustrated in FIG. 4b. In this method, an article window 130 lists all of the articles in the document. This article window derives the titles from the aforementioned article properties, as entered into the window 104 of FIG. 3f. In this instance, there is only one article in the document that can be selected but, typically, there will be a list of a number of articles which can be selected by means of an appropriate pointing mechanism such as a mouse 36. In any event, either of the methods of FIG. 4a or FIG. 4b can be used to select an article to view in an article mode. Of course, other selection mechanisms are also possible. For example, a "hyperlink" from another application program could be used to launch the article reading mode. With a hyperlink, a button or other icon can be selected which can activate the viewer of the present invention, set the article viewing mode, and set the pointer to an appropriate point in an article. As well known by those skilled in the art, hyperlinks therefore can operate much like "macros" to perform a series of sometimes conditional steps to achieve a desired result.

After an article has been selected for viewing in the article view mode, steps 106 and 108 of FIG. 4 occur. In other words, information concerning the current article section as determined by a pointer is retrieved, and then a portion of the article section is scaled to the window with a maximum zoom for enhanced readability (see FIG. 4c). In this instance, the article viewing area is the window 78 which previously displayed the document in the normal view. However, as noted, an article portion 132 has been scaled to about the size of this window 78 to enhance the readability of that portion. More specifically, window 78 has a width W and a length L. Typically, as a default, an internally stored pointer P points to the top of the first section of the article when the article has been selected by title, or to the top of the article section that was selected by the hand cursor 126. A process 108 then "pans" and "zooms" the document so that the article section starting at the pointer P is scaled in the horizontal direction to fit about the width W of the window 78. This scaling factor will determine the length of the article portion that will be displayed within the length L of the window 78. However, it has been found that there is a maximum amount of magnification or "zoom" that is comfortable to some readers. Therefore, it is possible that there is a maximum "zoom" (such as a 200% magnification) that will be allowed by the step 108. In such an event, the width of the article portion 32 will be somewhat less than the width W of the window 78 but, as a beneficial side effect, more of the length of the article portion 132 will be displayed within the window 78.

More specifically, the process 108 preferably first sets the current zoom to the maximum zoom indicated by the reader. Then, process 108 determines if the article width is greater than the window width at that zoom level. If it is not, the article portion is preferably centered within the window. If the article width is greater than the window width at the maximum zoom level, the current zoom level is adjusted as follows:

current zoom <=maximum zoom * (window width/article width)

Therefore, the zoom is scaled back by the ratio of the window width to the article width so that the article portion will fit the window.

If the hand cursor 126 is activated, the next view in the direction of the arrow 128 will be displayed. In other words, the activation of the user input device (such as mouse 36) will cause an article scroll of a portion of an article in a desired direction respective to the thread or content flow of the article.

In FIG. 4d, the next consecutive portion of the article is shown within window 78. In other words, decision step 112 detects the activation or "clicking" of the mouse at the position indicated by cursor 126 of FIG. 4c and determines that an article scroll is being commanded. Step 114 then resets the pointer P to a position P1 in the article and steps 106 and 108 cause a pan and zoom to display a second portion 134 of the article and window 78. It should be noted that this portion 134 includes the bottom region of the article section 1—1.

Figure 4E:
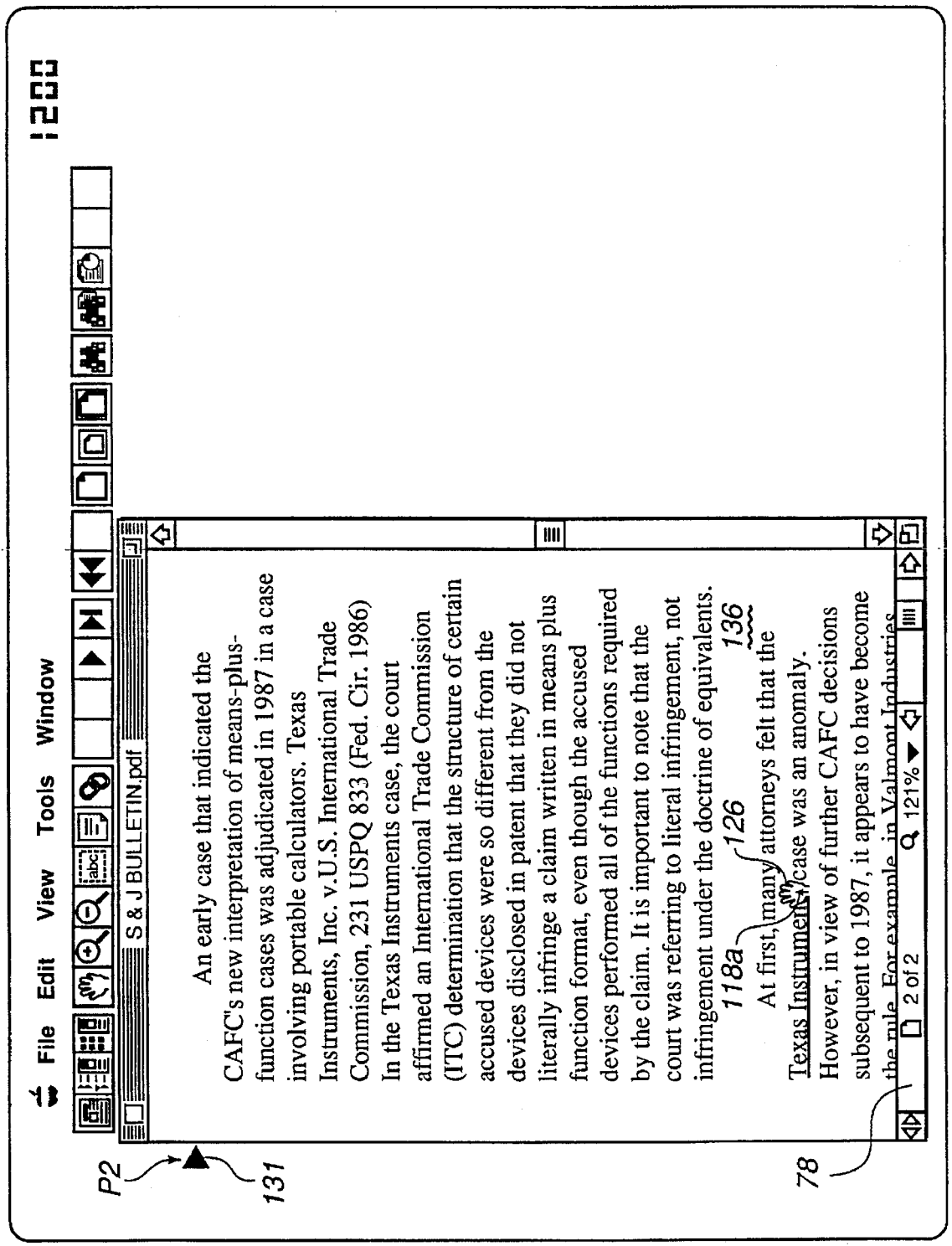

FIG. 4e illustrates what happens after the mouse is once again "clicked" when the hand cursor is at the bottom portion 134 of article section 1—1 as seen in FIG. 4d. The decision step 112 again determines that an article scroll command has been made and the pointer is reset from point $P_1$ in the article to the point $P_2$. This is accomplished because, due to the article links described previously, the bottom of the first article section 1—1 is considered to be consecutive (in a logical or content flow sense) with the top of the second article section 1–2. In other words, the article sections are considered to be consecutive due to their section links regardless of their physical location within the printed or display document and regardless of their storage locations and memory. Once again, steps 106 and 108 retrieve the appropriate information and then pan and scale the document to present portion 136 of the article within the window 78.

It should be noted that the scaling of the portions 132 (FIG. 4c) and 134 (FIG. 4d) is about 110%. However, as seen in FIG. 4e, the scaling of portion 136 is approximately 121%. This automated scaling for enhanced viewability relieves the user of the necessity of manually panning and zooming to make the article readable.

It should also be noted that the hand cursor 126 in FIG. 4e has an arrow 128a which points in an upward direction. In this instance, clicking the mouse with the cursor 126 and arrow 128a as shown will cause an upward article scroll such that the article portion 136 is replaced with the article portion of FIG. 4d. Therefore, it is clear that the thread of the article can be followed in either direction.

Figure 5:
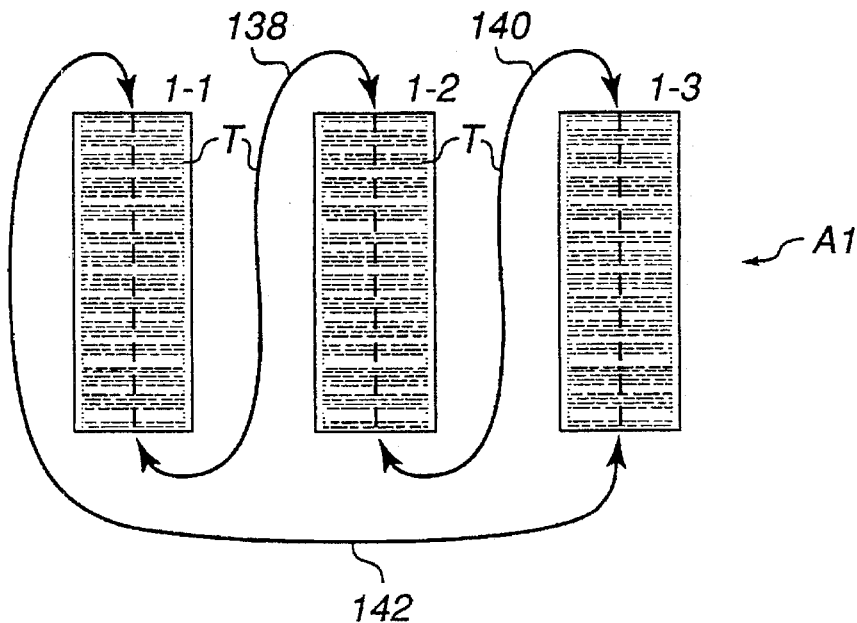
FIG. 5 is an illustration of a circular linking structure for article sections in accordance with the present invention.

FIG. 5 illustrates in graphical form the three article sections 1—1, 1–2, and 1–3 of an article A1. The links are indicated by the arrows 138, 140 and 142. Link 138 is between the bottom of the article section 1—1 and the top of the article section 1–2, link 140 is between the bottom of article section 1–2 and the top of article section 1–3, and link 142 is between the bottom of article section 1–3 and the top of article section 1—1. Therefore, the section links preferably form an ordering with a circular link structure. In essence, section link 138 makes the bottom of article section 1—1 consecutive with the top of article section 1–2 and section link 140 makes the bottom of article section 1–2 consecutive with the top of article section 1–3. Section link 142 (which is optional) makes the bottom of section 1–3 consecutive with the top of article section 1—1. Therefore any article scrolling which goes beyond a top or bottom of one of the article sections will create an article scroll to the next consecutive article section.

The combination of the article sections 1—1, 1–2, and 1–3 along with section links 138 and 140 (and optionally section link 142) creates an article thread T. If the article thread is followed in the forward direction, i.e. from article section 1—1 to article sections 1–2 and 1–3, the thread is in the direction of article content information flow. However, a user can also navigate in the reverse direction along thread T, i.e. in the reverse direction of content information flow.

The article thread T can be implemented in a variety of fashion, as will be appreciated by those skilled in the art. In the present embodiment of the invention, the article threads are implemented as "objects" within a computer implemented process. The creation and use of objects are well known to those skilled in the art.

PDF documents created by the present embodiment of the invention include zero or more article thread objects. Each thread will have a title and a list of thread elements (referred to as "beads"), which correspond to article sections. If a document includes any threads, they are stored in an array as the value of the "Threads" key in a Catalog object. As used herein, an "array" is an ordered list of elements which can be accessed by an array index. Each thread and each thread bead is defined as a dictionary. As used herein, a "dictionary" is a set whose elements can be accessed by name (i.e. a set of key-value pairs). A description of the PDF™ format version 1.0, including arrays and dictionaries, can be found in *The Portable Document Format Reference Manual*, Adobe Systems, Inc., Addison-Wesley, 1993, which is incorporated herein by reference. The key-value pairs for thread and thread bead dictionaries are found below in Tables 1 and 2, respectively.

TABLE 1(KEY-VALUE PAIRS IN A THREAD DICTIONARY)

Title String: (optional) The text name of the thread. The characters in this string are encoded using a predefined encoding PDFDocEncoding ThreadInfo dictionary: (optional) Contains key-value pairs describing thread attributes, such as Date, Author, Keywords, etc.

First dictionary: (required) This specifies which bead is the first element in the thread

TABLE 2(KEY-VALUE PAIRS IN A BEAD DICTIONARY)

Thread dictionary: (required for first bead in thread) Specifies the thread of which this bead is the first element.
Prev dictionary: (required) Specifies the previous bead of this thread. For the first bead of a thread, Prev specifies the last bead of the thread
Next dictionary: (required) Specifies the next bead of this thread. For the last bead of the thread, Next specifies the first bead of the thread.
Page dictionary: (required) Specifies the page upon which this bead appears.
Rect array: (required) Rectangle (bounding box) specifying this bead (article section)

Figure 6:
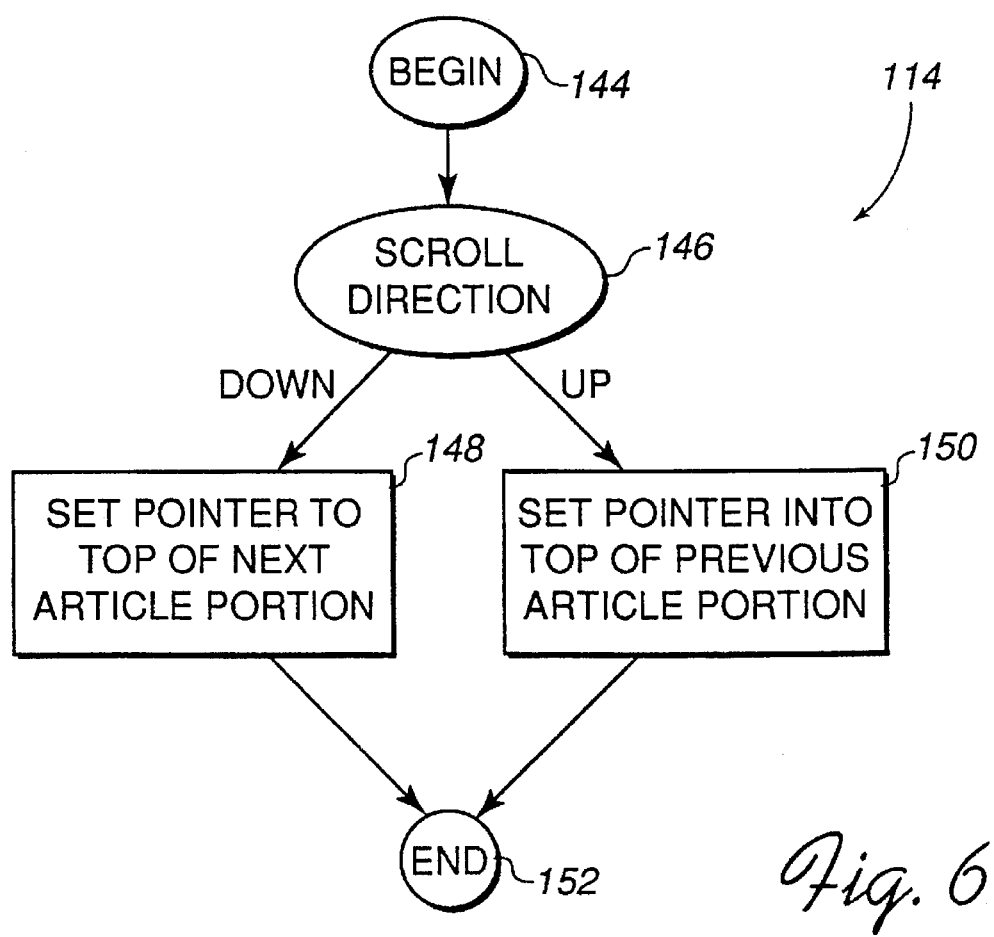
FIG. 6 illustrates the "Reset Pointer" step 114 of FIG. 4.

In FIG. 6, the "Reset Pointer" step 114 of FIG. 4 is shown in greater detail. The process of step 114 begins at 144 and, in a step 146, the scroll direction is determined. Scroll direction can be selected by the user in a number of well-known fashions. For example, if the mouse button is clicked with without pressing "shift" or some other "command" key, the scroll direction may be assumed to be down. If the mouse button is clicked while simultaneously pressing the shift key or some other command key, the scroll direction may be assumed to be up.

If the scroll direction is "down" the user desires to navigate through the article in the direction of content flow. This is accomplished by setting the pointer to the top of the next article portion as shown in step 148. If the scroll direction is "up", the user wishes to view the article in reverse content flow direction. This might occur, for example, if users wish to review something that they had just read. In this instance, a step 150 set the pointer into the previous article portion. The process of step 144 then ends at 152.

Figure 7:
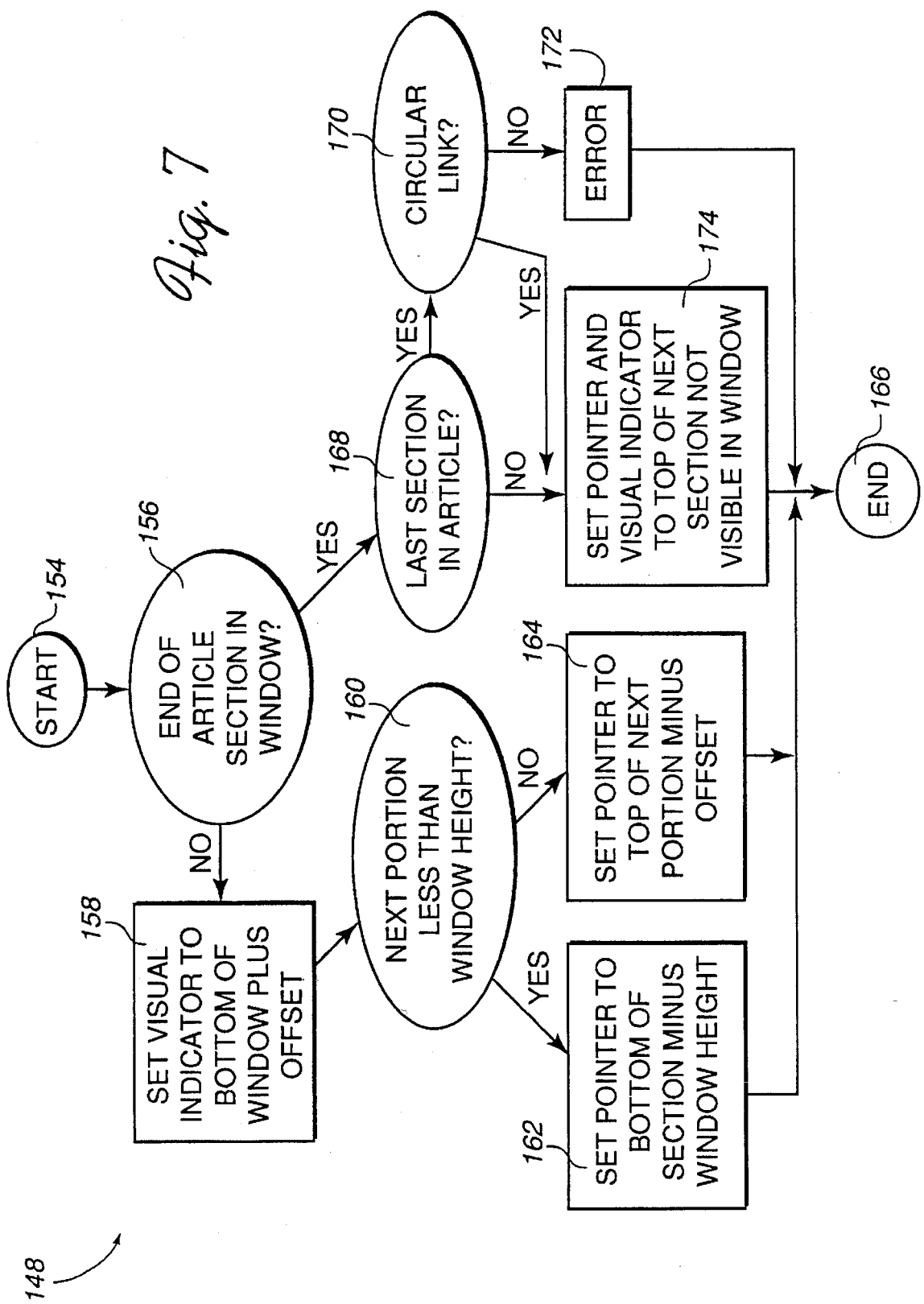
FIG. 7 is a flow diagram the "Set Pointer" step 148 of FIG. 6.

In FIG. 7, step 148 of FIG. 6, i.e. the downward article scroll, is illustrated in greater detail. The process 148 begins at 154 and, in a step 156 it is determined whether the end of the article section in within the current window. If not, a step 158 sets the visual indicator to the bottom of the window plus an offset. The offset is, as previously mentioned, about one line spacing. In the present embodiment, the offset is assumed to be about 16 pixels. Next, in a step 160, it is determined whether the next article portion is less than a full window in height. If it is, a step 162 sets the pointer to the bottom of the article section minus the window height. An example of this situation is seen in FIG. 4d. If step 160 determines that the next portion is not less than the window height, the pointer is set to the top of the next portion minus the offset. The process 148 is completed as indicated at 166 after the completion of steps 162 or 164.

If step 156 determines that the end of the article section is within the window, a step 168 determines whether this is the last section in the article. If yes, a step 170 determines whether the article sections are circularly linked, i.e. if the end of the last article section is linked to the beginning of the first article section and vice versa. If not, an error message (such as a beep) is generated in step 172, and the process 148 terminates at 166. If step 168 determines that it is not the last section in the article, or if step 170 determines that the article sections are circularly linked, then a step 174 sets the pointer and the visual indicator to the top of the next article section not currently fully visible in the window.

Step 174 therefore anticipates the situation where the article section heights are shorter than the window height, thereby allowing multiple article sections to be displayed within a window simultaneously, although only the first article section would be associated with the pointer and the visual indicator. In such an instance, the next logical article section to be viewed is the next article section not fully visible in the screen. If the article section is longer than the window height, the pointer and the visual indicator are set to the top of the next article section. The process 148 is then complete at 166.

Figure 8:
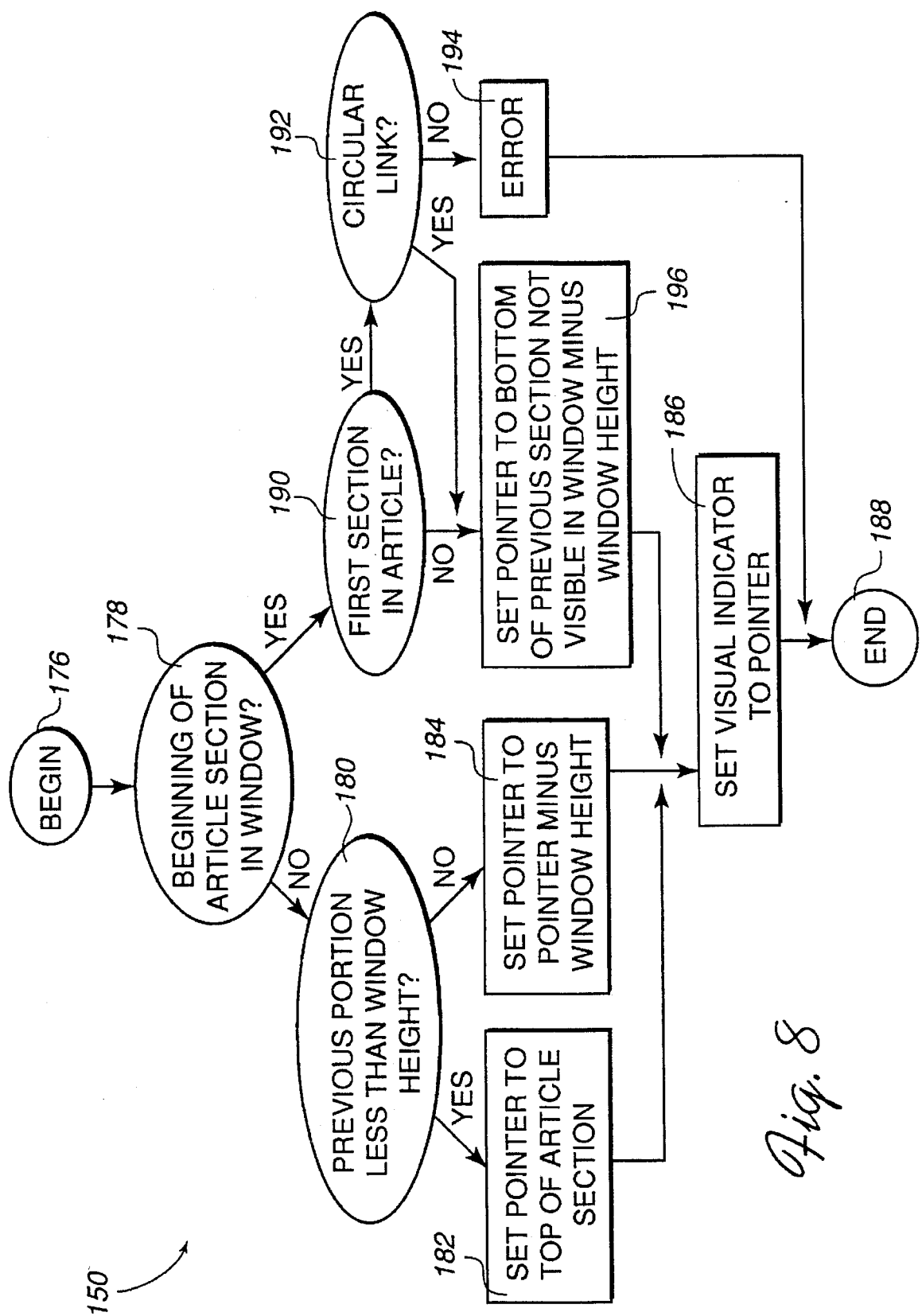
FIG. 8 is a flow diagram of the "Set Pointer" step 150 of FIG. 6.

In FIG. 8, step 150 of FIG. 8 is detailed. More specifically, an article up-scroll begins at 176 and, in a step 178, it is determined whether the beginning of an article section is within the display window. If not, a step 180 determines if the article portion preceding the current article portion is less than a window in height. If so, the pointer is set to the top of the current article section. If step 180 determines that the previous portion is not less than the window height, a step 184 sets the pointer to the current pointer position (i.e. the top of the current window) minus the window height. After the completion of either step 182 or 184, the visual indicator is set to the pointer, and the process 150 ends at 188.

If step 178 determines that the beginning of the current article section is within the window, then a step 190 determines whether the current article section is the first section in the article. If so, a step 192 determines whether the article sections are circularly linked, as described above. If not, an error message (e.g. a beep) is made by step 194 and the process completes at 188. If step 190 determines that the current article section is not the first article section, or if step 192 determines that the article sections are circularly linked, a step 196 sets the pointer to the bottom of the previous section that is not fully visible in the window minus one window height. This step 196 is quite analogous to the previously described step 174. Essentially, this step 196 takes care of both the situation where the article sections are shorter than the window height and longer than the window height. Step 186 then sets the visual indicator to the pointer position, and the process is completed at 188.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. An electronic document viewer comprising:
    a digital computer system including a digital processor, memory which includes memory storage locations accessible by said digital processor, a visual output device to generate a visual output derived, at least in part, from said digital processor, and an input device to generate an input that can be acted upon by said digital processor;
    an electronic document stored in said memory and including at least one article, said document having a predetermined final format defining a particular appearance for said document and said article within said document, said document including article section information and section link information describing an ordering of article sections of an article such that said article sections can be accessed in a consecutive fashion;
    mode means implemented on said digital computer system for determining one of a plurality of view modes including at least a normal view mode and an article view mode, wherein said view mode is selectable by a user of said digital computer system, and wherein said article view mode is a distinct, different view mode from said normal view mode;

normal view means implemented on said digital computer system for displaying at least a portion of said document on said visual output device in a normal view that displays the particular appearance of said document defined by said predetermined final format and provides document scrolling commands for scrolling the display of said document as a whole; and article view means implemented on said digital computer system for displaying at least a portion of a selected article on said visual output device in an article view that displays the particular appearance of said selected article defined by said predetermined final format and provides article scrolling commands for the sequential viewing of consecutive article sections of said selected article based upon said section link information, said sequential article viewing being implemented only when said view mode is said article view mode, and said sequential article sections being accessed by said user entering an article scrolling command to view a consecutive article section.

2. An electronic document viewer as recited in claim 1 wherein said document further includes at least one additional item, wherein said additional item may be viewed in said normal view mode, but is not viewed in said article view mode.

3. An electronic document viewer as recited in claim 2 wherein said normal view means displays at least a portion of said document in a window on said output device, and is responsive to said input device to permit other portions of said document to be viewed within said window.

4. An electronic document viewer as recited in claim 1 wherein said document includes a plurality of articles, each of which comprises a plurality of article sections and associated section links.

5. An electronic document viewer as recited in claim 1 wherein said article view means displays at least a portion of said selected article in a window on said output device, and is responsive to said input device to permit other portions of said article to be viewed within said window.

6. An electronic document viewer as recited in claim 5 wherein said portion of said selected article is automatically sized to said window by said article view means to enhance the readability of said portion.

7. An electronic document viewer as recited in claim 6 further comprising a visual indicator to indicate a starting point for reading in said portion, said starting point being a point at an end of the previously displayed portion of said selected article.

8. An electronic document viewer as recited in claim 6 wherein said portion is automatically sized by adjusting the size of said article such that a width of said article is sized towards a width of said window.

9. An electronic document viewer as recited in claim 8 wherein said portion is automatically sized such that any increase in size of said portion is limited to a maximum increase.

10. An electronic document viewer as recited in claim 6 wherein a length of said portion that is displayed in said window is determined by said automatic sizing.

11. An electronic document viewer as recited in claim 10 wherein said additional portions of said selected article are displayed consecutively with said portion of said article that is displayed in said window.

12. An electronic document viewer as recited in claim 11 wherein a first article section is linked to a last article section of an article such that said first article section is displayed consecutively with a second article section and said last article section, and said last article section is displayed consecutively with a penultimate article section and said first article section.

13. An electronic document viewer as recited in claim 1 further comprising article view exit means implemented on said digital computer system for returning to said normal view mode upon an exit from said article view mode.

14. An electronic document viewer as recited in claim 13 wherein said article view exit means restores about said normal view that was displayed just prior to entering said article view mode.

15. A method for viewing electronic documents on a digital computer comprising the steps of:

storing in a memory of a digital computer an electronic document including at least one article having article sections and section links between article sections such that said article sections can be accessed in a consecutive fashion regardless of a physical positioning of an article section within said document;

accepting a selection by a user of an article to be displayed on an output device of said digital computer;

accepting a selection by a user of a view mode from a plurality of view modes including a normal view mode and said article view mode;

displaying with said output device at least a portion of said article;

accepting an input action by a user from an input device of said digital computer; and interpreting said input action as a first command to display a portion of the document if said normal view mode was selected, and interpreting the same input action as a second, different to enter a command to cause the display of additional portions of said article with said output device by accessing said article sections and said section links if said article view mode was selected.

16. A method as recited in claim 15 wherein said step of selecting an article comprises selecting an article from a list of articles with said input device.

17. A method as recited in claim 15 wherein said step of selecting an article comprises the use of a hyperlink or macro to launch said article view mode.

18. A method as recited in claim 15 wherein said step of selecting an article comprises selecting an article from a view of said document that includes at least a portion of said article.

19. A method as recited in claim 18 wherein said step of selecting an article comprises pressing a button associated with a pointing system, and wherein said article portion will begin at one of the top of an article section currently displayed in said view or at the top of the article so selected.

20. A method as recited in claim 15 wherein said step of displaying includes displaying at least said portion of said article within a window on said output device of said digital computer.

21. A method as recited in claim 20 wherein said step of displaying further causes said portion to be automatically sized to said window to enhance the readability of said portion.

22. A method as recited in claim 21 wherein said portion is automatically sized by adjusting the size of said article such that a width of said article is sized towards a width of said window.

23. A method as recited in claim 22 wherein said portion is automatically sized such that any increase in size of said portion is limited to a maximum increase.

24. A method as recited in claim 23 wherein a length of said portion that is displayed in said window is determined by said automatic sizing.

25. A method as recited in claim 24 wherein additional portions of said selected article are displayed consecutively with said portion of said article that is displayed in said window.

26. A method as recited in claim 25 wherein a first article section is linked to a last article section for an article such that said first article section is displayed consecutively with a second article section and said last article section, and said last article section is displayed consecutively with a penultimate article section and said first article section.

27. A method as recited in claim 21 wherein said electronic document has a predetermined final format defining a particular appearance for said electronic document and said article in said electronic document, where the displaying of said article displays said article in its predetermined final format.

28. A method as recited in claim 15 wherein said displaying step further includes displaying a visual pointer indicating reading position within said article portion as determined by an end of a previously displayed article portion.

29. A method as recited in claim 15 wherein said step of accepting a selection by a user of an article includes selecting an image of said article displayed on said screen along with other portions of said document.

30. A method as recited in claim 15 wherein said electronic document has a predetermined final format defining a particular appearance for said electronic document and said article in said electronic document, where the displaying of said article displays said article in its predetermined final format.

31. An electronic document system comprising:

a document generator for creating an electronic document in a predetermined final format, said document including at least one article having a plurality of article sections, said document including article section information and section link information that describes links between consecutive and related article sections of an article, where said document and article are each created by the generator to have a particular appearance defined by said final format for readers of said document, and where said article sections appear physically separated within said document; and a document reader for displaying said document in a plurality of view modes including at least a normal view mode in which said document as a whole including said article is displayed in its final format appearance and in which document scrolling operations are provided to scroll a page of said document as a whole, and an article view mode, where said normal view mode does not require the use of said article section information and section link information, and where said article view mode makes use of said article section information and said link information to display in their final format appearance at least portions of said article sections, such that in the article view mode, article scrolling operations scroll the entirety of said article for display as logically consecutive sections regardless of the physical arrangement of any article section within said document only after said article view mode has been entered.

32. An electronic document system as recited in claim 31 wherein said document generator comprises:

a visual display to display at least a portion of said documents; and a pointer mechanism for selecting article sections within said display of at least said portion of said document.

33. An electronic document system as recited in claim 32 wherein after a newly selected article section is selected by said pointer mechanism it is automatically linked to a previously selected article section.

34. An electronic document system as recited in claim 32 wherein said pointer mechanism is used to manually link and unlink article sections.

35. A reader for displaying an electronic document having a predetermined format, said document including an article having content flow information, said article including a plurality of sequential portions, said reader comprising:

a selector to select from an electronic document having a predetermined final format an article of said document to be read, said article having a predetermined final format within said formatted document, having content flow information, and having a plurality of sequential portions physically separated within the final format of the document;

a displayer to display a portion of said document in a manner for easy viewing and comprehension; and a navigator operating in one of a plurality of modes including a normal view mode and an article view mode, said navigator interpreting an input event received from an input device as a first command to display a portion of said document in said predetermined final format of said document when said navigator is in said normal view mode, and interpreting the same input event as a second, different command to display a portion of said article in said predetermined final format of said article by accessing said content flow information to navigate among the sequential portions of said article when said navigator is in said article view mode.

36. A reader as recited in claim 35 wherein said displayer implements at least one of a pan and a zoom of said first, next, and remaining portions of said article, as required for easy viewing and comprehension.

37. A reader as recited in claim 35 further comprising a visual indicator for indicating a reading position in a portion of said article being displayed, said reading position being the position of a next line of text to be read by a user after a previously displayed portion of said article.

* * * * *